(12) United States Patent
Ryu et al.

(10) Patent No.: US 6,791,949 B1
(45) Date of Patent: Sep. 14, 2004

(54) NETWORK PROTOCOL FOR WIRELESS AD HOC NETWORKS

(75) Inventors: Bong K. Ryu, Thousand Oaks, CA (US); Jason C. Erickson, Thousand Oaks, CA (US); James X. Smallcomb, Westborough, MA (US); Son K. Dao, Northridge, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 09/561,399

(22) Filed: Apr. 28, 2000

(51) Int. Cl.[7] .................................................. H04Q 7/20
(52) U.S. Cl. ........................ 370/254; 370/312; 370/410; 370/432
(58) Field of Search ................................ 370/254, 255, 370/310, 312, 328, 329, 351, 400, 401, 410, 432, 465, 475; 455/422.1, 445, 452.1

(56) References Cited

U.S. PATENT DOCUMENTS

| | | | |
|---|---|---|---|
| 5,355,371 A | * 10/1994 | Auerbach et al. | ........... 370/255 |
| 5,455,569 A | * 10/1995 | Sherman et al. | ....... 340/825.02 |
| 5,495,479 A | * 2/1996 | Galaand et al. | ............. 370/404 |
| 5,850,592 A | * 12/1998 | Ramanathan | ................... 455/7 |
| 5,974,236 A | * 10/1999 | Sherman | ..................... 709/221 |
| 5,987,011 A | 11/1999 | Toh | |
| 6,304,556 B1 | * 10/2001 | Haas | .......................... 370/254 |
| 6,349,091 B1 | * 2/2002 | Li | .............................. 370/238 |
| 6,349,210 B1 | * 2/2002 | Li | .............................. 455/450 |
| 6,385,174 B1 | * 5/2002 | Li | .............................. 370/252 |
| 6,396,814 B1 | * 5/2002 | Iwamura et al. | ............ 370/256 |
| 6,456,599 B1 | * 9/2002 | Elliott | ........................ 370/254 |
| 6,512,935 B1 | * 1/2003 | Redi | ........................... 455/574 |
| 6,535,498 B1 | * 3/2003 | Larsson et al. | ............. 370/338 |

OTHER PUBLICATIONS

Raghupathy Sivakumar et al., "Spine Routing in Ad Hoc Networks", Cluster Computing 1 (1998) pp. 237–248.

* cited by examiner

*Primary Examiner*—Hassan Kizou
*Assistant Examiner*—Mike McLoughlin
(74) *Attorney, Agent, or Firm*—Daly, Crowley & Mofford, LLP

(57) ABSTRACT

A method for establishing and maintaining a wireless ad hoc network comprising backbone nodes which forward packets through the network and non-backbone nodes which are capable of using the network, but do not forward packets. Signaling packets containing one or more protocol support records are periodically generated and transmitted by each node to neighboring nodes and are forwarded through the network by backbone nodes. Non-network nodes are initially selected to become backbone members during a SELECTION process based on an assessment of the node's connectivity relative to its neighbors. Link quality between nodes is monitored and used during an EXPANSION process in which additional non-network nodes may become backbone members. Disconnected backbone segments are interconnected during a CONNECTION process and the network is maintained during a MAINTENANCE process by periodically assessing the value of a backbone node's membership in the backbone. Efficient multicast routing is supported over the backbone by dynamically establishing and maintaining multicast trees. Signaling packets are periodically and frequently generated, thereby facilitating rapid adaptation to network changes. Further, the signaling packets are efficiently forwarded only by backbone nodes, thereby reducing bandwidth associated with establishing and maintaining the network.

19 Claims, 15 Drawing Sheets

FIG. 4

| Table Index | μ | Deletion Time Stamp | Pointer (index) to Route Table | Pointer (index) to Neighbor Status Table | Pointer (index) to Record Queue |
|---|---|---|---|---|---|
| 1 | $N_{B5}$ | 84757 | 1 | 1 | NULL |
| 2 | $N_{G10}$ | 84744 | 2 | 2 | 1 |
| 3 | $N_{G11}$ | 84768 | 3 | 3 | 2 |
| 4 | $N_{G12}$ | 84741 | 4 | 4 | NULL |
| 5 | $N_{G13}$ | 84789 | 5 | 5 | 3 |
| 6 | $N_{B4}$ | 84763 | 6 | NULL | 5 |
| 7 | $N_{B6}$ | 84788 | 7 | NULL | NULL |

FIG. 4A

| Table Index | Color | Backbone Capable Flag | Deg δ(μ) | BDeg | BD MAX | Last Rx Seq. # | Last Rx Time | $LQ_{FROM}$ LQ Filter Value | Rate Estimate (sec/pkt) | Deletion Time Stamp | $LQ_{TO}$ | Seq. # Counter | Primary Gateway Degree |
|---|---|---|---|---|---|---|---|---|---|---|---|---|---|
| 1 | B | Y | 0 | 3 | 2 | 1 | 84751 | 18 | .1 | 84757 | 15 | NULL | 9 |
| 2 | G | Y | 1 | 1 | 1 | 3 | 84681 | 11 | 6.3 | 84744 | NULL | NULL | 3 |
| 3 | G | Y | 2 | 1 | 1 | 2 | 84632 | 14 | 8.5 | 84768 | NULL | NULL | 3 |
| 4 | G | N | 2 | 1 | 1 | 3 | 84690 | 12 | 4.3 | 84741 | NULL | NULL | 3 |
| 5 | G | Y | 2 | 2 | 1 | 6 | 84674 | 9 | 9.8 | 84789 | NULL | NULL | 3 |

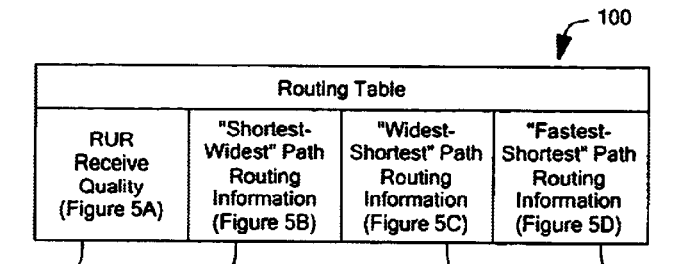

FIG. 5

| | Routing Table | | | |
|---|---|---|---|---|
| | RUR Receive Quality (Figure 5A) | "Shortest-Widest" Path Routing Information (Figure 5B) | "Widest-Shortest" Path Routing Information (Figure 5C) | "Fastest-Shortest" Path Routing Information (Figure 5D) |

| | | Route Update Record (RUR) Receive Quality | | | |
|---|---|---|---|---|---|
| Table Index | Last Rx Seq. # | Last Rx Time | LQ Filter Value | Rate Estimate (sec/pkt) | Deletion Time Stamp |
| 1 | 1 | 84751 | 18 | 10.3 | 84757 |
| 2 | 3 | 84681 | 11 | 6.3 | 84744 |
| 3 | 2 | 84632 | 14 | 8.5 | 84768 |
| 4 | 3 | 84690 | 12 | 4.3 | 84741 |
| 5 | 6 | 84674 | 9 | 9.8 | 84789 |
| 6 | 4 | 84680 | 15 | 8.1 | 84763 |
| 7 | 5 | 84693 | 13 | 5.6 | 84788 |

FIG. 5A

| | "Shortest-Widest" Routing Info | | | | | | | | |
|---|---|---|---|---|---|---|---|---|---|
| Table Index | Primary Route | | | | | Secondary Route | | | |
| | Gateway Address | NIT Pointer | HC | Avail. BW (kbps) | Deletion Time Stamp | Gateway Address | NIT Pointer | HC | Avail. BW (kbps) | Deletion Time Stamp |
| 1 | $N_{B5}$ | 1 | 1 | 70 | 84757 | NULL | | | | |
| 2 | $N_{G10}$ | 2 | 1 | 90 | 84744 | NULL | | | | |
| 3 | $N_{G11}$ | 3 | 1 | 90 | 84768 | NULL | | | | |
| 4 | $N_{G12}$ | 4 | 1 | 90 | 84741 | NULL | | | | |
| 5 | $N_{G13}$ | 5 | 1 | 90 | 84789 | NULL | | | | |
| 6 | $N_{B5}$ | 1 | 2 | 45 | 84763 | NULL | | | | |
| 7 | $N_{B5}$ | 1 | 2 | 60 | 84788 | NULL | | | | |

NETWORK PROTOCOL FOR WIRELESS AD HOC NETWORKS

CROSS-REFERENCE TO RELATED APPLICATIONS

Not applicable.

STATEMENT REGARDING FEDERALLY FUNDED RESEARCH

Not applicable.

BACKGROUND OF THE INVENTION

Wireless communication networks have significant application in permitting communication between various types of mobile apparatus, referred to herein as nodes. One such growing application is in tactical military environments in which the network is subject to rapid changes by which nodes are added, removed or moved from one location to another within the network. Such dynamically changing wireless networks are sometimes referred to as wireless ad hoc networks and include nodes which are able to communicate with each other over a wireless media, without any infrastructure, or wired network. Illustrative nodes include cellular telephones and portable computers which communicate by transmitting and receiving radio frequency (RF) signals in the form of packets.

Desirable characteristics of wireless ad hoc networks include the ability to adapt to frequent and rapid changes in node connections, compatibility with the Internet Protocol (IP) and other network protocols, and the ability to provide reliable communication. It is further desirable that the bandwidth necessary to establish and maintain the wireless ad hoc network not be excessive in order to permit a high data throughput and conserve node battery power.

In general, each network node maintains a routing table containing one or more routes to every other node in the network. Routing tables may be updated periodically or in response to detection of a change in the network. Various techniques are used to update routing tables. One such technique requires that each network node broadcast a routing message to every other network node, thereby permitting each node to learn the identity and connectivity of every other network node and, with that information, determine one or more optimal routes to each such node. However, such a broadcast-based approach requires significant bandwidth and thus, reduces data throughput.

In many wireless networks, every network node is capable of receiving packets from a source node and forwarding packets to a destination node. However, in some wireless ad hoc networks, only selected nodes are designated as "backbone nodes" and provide a fully connected packet forwarding infrastructure responsible for forwarding packets from a source node to a destination node, while the remaining network nodes are able to use the network (i.e., send and receive packets), but do not forward packets from a source node to a destination node. Such networks strike a balance between designating as backbone nodes the fewest number of nodes necessary to fully connect the network in order to increase bandwidth efficiency by reducing overhead and competition for channel capacity, while also providing some desirable redundancy in order to provide alternate route options and reduce congestion, or bottlenecking. One such network is described in a paper entitled "Spine routing in ad hoc networks", R. Sivakumar, et al. Cluster Computing 1 (1998) p. 237–248 and may be characterized as an approximation to a "Minimal Connected Dominating Set" which is the smallest subset of a set of nodes in which all of the nodes of the subset are connected and can reach every node in the set via a single transmission, or hop.

Such networks advantageously reduce the bandwidth associated with updating routing tables. Further, since the backbone nodes have the greatest power requirements, minimizing the number of backbone nodes permits the nodes which may not have the necessary power capability to use the network. Additionally, both broadcast and multicast transmissions (i.e., single source with multiple receivers) are optimized since minimizing the backbone size minimizes replication of data at intermediate backbone nodes. However, care must be taken in providing a protocol for establishing and maintaining such networks in order to achieve these advantages while also providing a network capable of quickly and reliably adapting to a dynamically changing network.

SUMMARY OF THE INVENTION

It is an object of the present invention to provide a network protocol which is capable of rapidly adapting to network changes.

It is a further object to provide a network protocol which requires minimal bandwidth for establishing and maintaining the network.

Yet another object of the invention is to provide a network protocol which results in reliable communication between network nodes.

A still further object of the invention is to provide a network protocol which permits efficient multipoint-to-multipoint (multicast) communication among network nodes.

These and other objects of the invention are achieved by a method, or protocol for establishing a network from a plurality of nodes based on the periodic transmission and processing of signaling packets containing one or more protocol support records. The network includes a plurality of backbone nodes which are responsible for forwarding packets containing protocol records and other packets through the network (herein "category black nodes") and a plurality of non-backbone nodes which are capable of reliably transmitting and receiving packets on the network, but which do not forward packets to other nodes (herein "category green nodes"). A third category of nodes (herein "category white nodes") implement the protocol of the invention, but are not part of the network backbone and have not identified the existence of a reliable connection with a network backbone node.

Protocol support records include the Transmitter Status Record, Next Hop Information Record, Route Update Record, Address Resolution Notification Record, Address Resolution Query/Response Record, Route Query/Response Record, Multicast Join/Leave Record. The Transmitter Status and Next Hop Information Records are not forwarded through the network (i.e., they support 'local' (one hop) protocol information exchange). All other record types are forwarded through the network backbone.

To support the network protocol and routing methods, each node maintains a Node Information Table (herein "NIT") in which it stores and maintains basic information about other nodes in the network. For each listed node, such information includes, for example, the node's MAC address and a deletion time stamp. Each node's NIT entry also contains pointers to three other protocol tables—the Route Table, the Neighbor Status Table, and the Protocol Support Record Queue. A node's Route Table entry contains primary and secondary routes to reach it, with respect to a plurality of Quality of Service (QoS) routing metrics (i.e., such as bandwidth and delay). Routes are represented by the "next hop address" (gateway node) through which the node can be reached and the level of QoS that the route is capable of supporting. The Route Table also contains received quality information that represents the regularity and estimated rate with which route updates are being received from the destination. The Neighbor Status Table contains status information about neighbor nodes contained in received Transmitter Status Records. Status information includes, for example, category designation (herein "color"), backbone capability, non-category black neighbor count (herein "degree"), category black neighbor count (herein "black degree"), receive link quality data, transmit link quality data (obtained from the node's Next Hop Information Record), and a sequence number counter which supports a CONNECTION process.

Network backbone creation begins with a SELECTION process which is performed only by white nodes. SELECTION is responsible for identifying an initial set of network backbone nodes (i.e., it "seeds" the network with black nodes). In general, a category white node is selected to become a backbone node as a result of having more non-backbone neighbors than any of its neighboring nodes.

An EXPANSION process is also performed by category white nodes and, in particular, by category white nodes that do not pass the SELECTION process. EXPANSION is the process by which a white node 'asks' a green neighbor to become a network backbone node (via the Next Hop Information Record's next hop address and next hop control fields). This will cause the category white node to become category green, since it now has a category black neighbor. Collectively, the SELECTION and EXPANSION processes result in a network consisting of green and black nodes with varying degrees of backbone connectivity (i.e., the set of black nodes may or may not be fully connected).

CONNECTION is the process by which disconnected backbone segments become fully connected. Category green nodes determine whether or not they span disconnected backbone segments based on redundant Route Update Record receptions. To detect disjoint backbone segments, each green node selects one of its black neighbors as its Connection Test Point (CTP). Since the backbone's responsibility is to forward Route Update Records (RURs), it follows that a green node can expect to hear its neighbors' RURs twice—once from the neighbor's original transmission and once from its CTP. If a category green node hears a neighbor's RUR directly but does not hear the RUR forwarded by its CTP, it can be concluded that the neighbor is disconnected from the backbone segment represented by its CTP. A green node monitors both category green and category black neighbors, which represent the two basic types of CONNECTION processes. If the neighbor is a black node, then a black-green-black (B-G-B) disconnect condition has been detected since the green node is connecting a black neighbor with its CTP. For B-G-B disconnections, the category green node simply transitions to category black, thereby connecting the two disconnected category black nodes. If the neighbor is a category green node, a B-G-G-B disconnect condition has been detected since the green node is connecting its green neighbor's CTP to its own CTP. For B-G-G-B disconnections, the green node and its green neighbor transition to category black (using a two way exchange of Next Hop Information Records containing each other's address and the appropriate next hop control field setting).

The network backbone is maintained using the protocol's MAINTENANCE process. As RURs are forwarded through the network backbone, nodes update their Route Tables. This process effectively yields a list of next hop addresses (herein "gateways") that represent valuable routing alternatives. The Next Hop Information Record's next hop address and next hop control fields are used to advertise gateways. A backbone node expects to hear itself advertised by at least one of its neighbors within a nominal period of time (herein "gateway timeout"). If a backbone node does not hear itself advertised as a gateway within this period, it will either: (a) transition to category green if it has at least one category black neighbor; or (b) transition to category white if it does not have at least one black neighbor.

Efficient multicast routing is achieved over the established backbone by forwarding packets only to members of a multicast group rather than broadcasting packets to all nodes. Multicast trees (i.e., subsets of backbone nodes) are dynamically established and maintained based on the status of a Multicast Routing Table maintained by each backbone node and in response to Multicast Join and Leave Records.

All nodes generate signaling packets containing protocol support records at random intervals, between a specified maximum and minimum interval. The maximum and minimum intervals are selected according to the expected mobility of network nodes and predefined limits on bandwidth utilization for the purpose of protocol signaling. A node's basic signaling packet contains, at a minimum, a Transmitter Status Record, a Next Hop Information Record, and a Route Update Record. The purpose of this basic signaling packet generation process is to support local node discovery and status dissemination, as well as inject the node's own Route Update Record into the network.

Backbone nodes also generate and transmit signaling packets for the purpose of forwarding multi-hop records and providing local feedback to neighbor nodes. From a system perspective, bandwidth utilization for this function must be limited to acceptable levels. In particular, category black nodes track the rate at which records are inserted into the Protocol Support Record Queue. This rate is translated into a signaling packet generation rate that would effectively empty the queue as fast as it is filled. If bandwidth utilization levels allow, a black node generates signaling packets as fast as is necessary to maintain an empty record queue. If however, system bandwidth utilization dictates a decrease in the signaling packet generation rate; then a black node will accordingly to decrease its signaling packet generation rate and discard records that have expired or are lower priority (queue overflow).

Use of the described signaling packets for establishing and maintaining a wireless ad hoc network advantageously provides a simple technique for dynamically modifying the network based on mobility of nodes and minimizes the bandwidth necessary for such functions. This is because (1) the signaling packets are small in size (tens of bytes) due to their "record-based" structure, as opposed to the use of "fixed format" packets designed to provide complete update information whether or not it is necessary; (2) signaling packets are forwarded only by backbone nodes rather than, for example, being broadcast by all network nodes ("flooding"); (3) protocol support records support explicit functionality and can, therefore, be prioritized and selectively purged to accommodate fluctuations in available bandwidth; and (4) signaling packets are generated at predetermined, periodic rates, thereby resulting in node status and routing information being continuously updated and in continuous and rapid adaptation to network changes (i.e., as contrasted to disseminating such information only after a change is detected).

A key aspect of the invention is multi-hop link quality inference. Neighbor interaction that controls backbone creation and maintenance does not take place unless the neighbors have verified acceptable link quality (a system specific definition). With this knowledge, local exchange of link quality information is enough to support multi-hop route verification (i.e., a node knows that it only receives RURs over routes whose links pass the same quality test as its link with the gateway delivering the RUR). Receive link quality monitoring is supported by the Transmitter Status Record's transmitter address and sequence number. The Next Hop Information Record's next hop address and link quality (LQ) fields support the exchange of receive link quality values, which provides two-way link quality information for a node.

BRIEF DESCRIPTION OF THE DRAWINGS

The foregoing features of this invention, as well as the invention itself, may be more fully understood from the following description of the drawings in which:

FIG. 4 illustrates the Node Information Table (NIT) for node $N_{B8}$ of FIG. 1 which is illustrative of the type of NIT maintained by each of the network nodes;

FIG. 4A illustrates the Neighbor Status Table for node $N_{B8}$ of FIG. 1 which is illustrative of the type of Neighbor Status Table maintained by each of the network nodes;

FIG. 5 shows an illustrative structure for the Route Table maintained by each of the network nodes;

FIG. 5A shows exemplary RUR receive quality information contained in the Route Table of node $N_{B8}$ of FIG. 1;

FIG. 5B shows exemplary "Shortest-Widest" Path routing information contained in the Route Table of node $N_{G8}$ of FIG. 1;

DETAILED DESCRIPTION OF THE INVENTION

Figure 1:
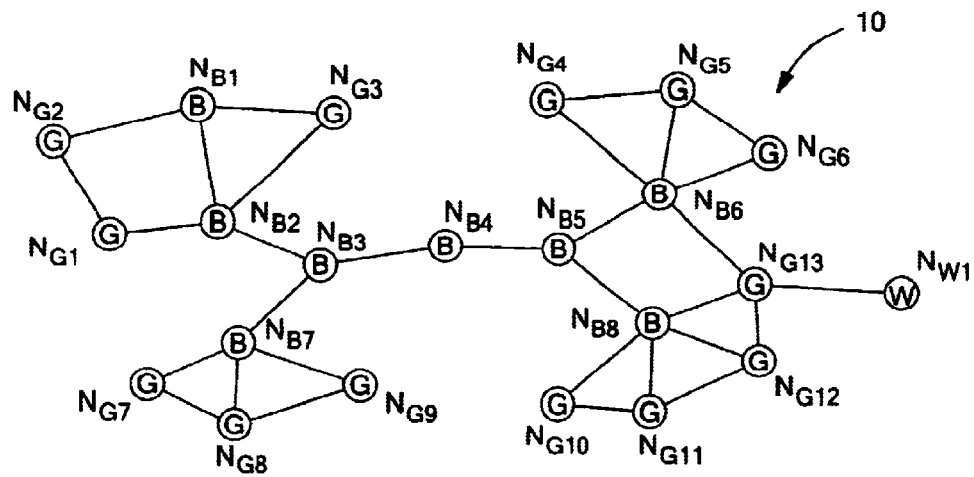
FIG. 1 is a diagram of a wireless network during creation of the backbone according to the present invention.

Referring to FIG. 1, a wireless network 10 includes a plurality of mobile nodes $N_{B1}-N_{Bn}$ and $N_{G1}-N_{Gn}$ which communicate with one another via wireless signal transmissions, such as radio frequency (RF) signals in the form of packets. The nodes $N_{B1}-N_{Bn}$ and $N_{G1}-N_{Gn}$ may be generally referred to as wireless communications nodes, that support various types of user information flows (e.g., data, voice, video). The apparatus and methods of the present invention provide a packet forwarding infrastructure (herein referred to as the "network backbone") that globally connects the network of nodes (i.e., any two or more nodes can exchange packets using the network backbone). Furthermore, the described protocol does not preclude directly connected nodes (i.e., neighbors) from exchanging packets without network backbone support. In particular, the protocol of the present invention governs creating and maintaining the network 10.

Each of the nodes of the network 10 has a category, or state associated with it. Nodes that are part of the network backbone (labeled $N_{B1}-N_{BN}$) are referred to herein as "category black nodes" or simply "black nodes." Category black nodes support packet forwarding between non-neighboring nodes (i.e., nodes that are not capable of one hop, or direct communication). Nodes that are not part of the network backbone, but can communicate directly with one or more black nodes with acceptable link quality are labeled $N_{G1}-N_{Gn}$ and are referred to herein as "category green nodes" or simply "green nodes." A node is a "neighbor" of another node if the two nodes can communicate directly with each other (i.e., one hop communication). The network backbone, therefore, represents a packet forwarding infrastructure for the exchange of packets between non-neighbor nodes. Successful implementation of the described protocol results in all network nodes being either category black or category green and any two category black nodes being connected through the network backbone. The exception to this statement is a network in which all nodes are neighbors of each other. In this case, a network backbone is not required.

A third category of nodes (labeled $N_{w1}-N_{wn}$ and referred to herein as "category white nodes" or simply "white nodes") implement the protocol of the invention, can transmit packets to and receive packets from other nodes, but have not identified the existence of a reliable connection with a backbone node. More particularly, a node is a white node because it has not detected a black neighbor with which it has acceptable two-way link quality. For example, when a node initially powers up, it is a category white node since it has not yet detected any neighbors at all.

The network protocol described herein governs creating and maintaining the network backbone. Establishing and maintaining the network 10 is achieved by four processes: (1) backbone SELECTION, which is performed by white nodes in order to determine if their state should be changed to category black; (2) backbone EXPANSION, which is performed by white nodes to determine if a category green neighbor should become a black node (thereby making the category white node a category green node); (3) backbone CONNECTION, which is performed by green nodes in order to connect disconnected category black nodes (i.e., in order to "fully connect" disjoint network backbones); and (4) backbone MAINTENANCE, which provides ongoing feedback to existing backbone nodes that they should maintain their status as backbone nodes.

Figure 1A:
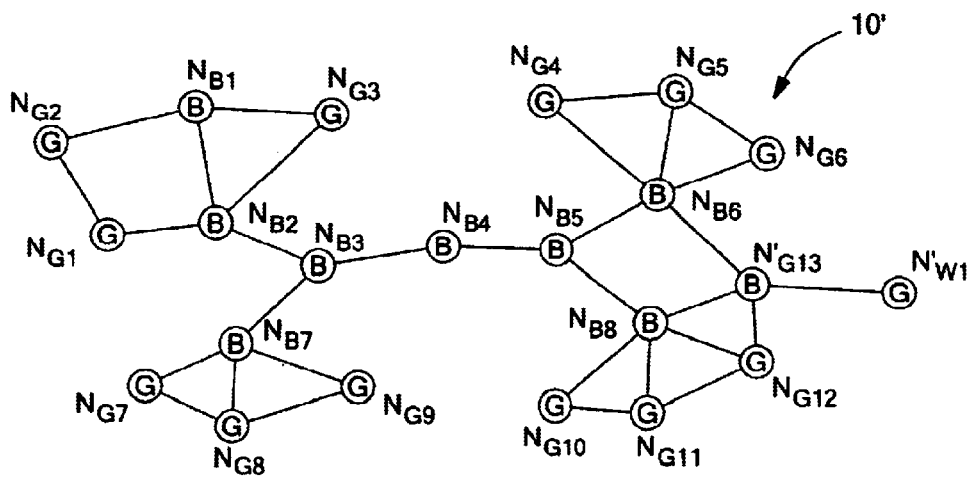
FIG. 1A is a diagram of the wireless network of FIG. 1 after the backbone is created.

Implementation of the protocol of the present invention yields a fully connected network containing only category black nodes and category green nodes, as is illustrated by the network 10' of FIG. 1A. For example, one illustrative implementation of the protocol causes node $N_{W1}$ of FIG. 1 to transition to category green (as is labeled $N_{W1}{'}$ in FIG. 1A) and node $N_{G13}$ of FIG. 1 to transition to category black (as is labeled $N_{G13}{'}$ in FIG. 1A) in accordance with the backbone EXPANSION process described in conjunction with FIG. 8.

Much of the described network protocol is based on the periodic generation, transmission, and processing of signaling packets, or SPs. Signaling packets are periodically generated and transmitted by each node of all three categories. The delay between successive signaling packet generation events at a node is randomly distributed (uniform) over a specified minimum and maximum delay. Like all packets, signaling packets are forwarded only by category black nodes.

Figure 2:
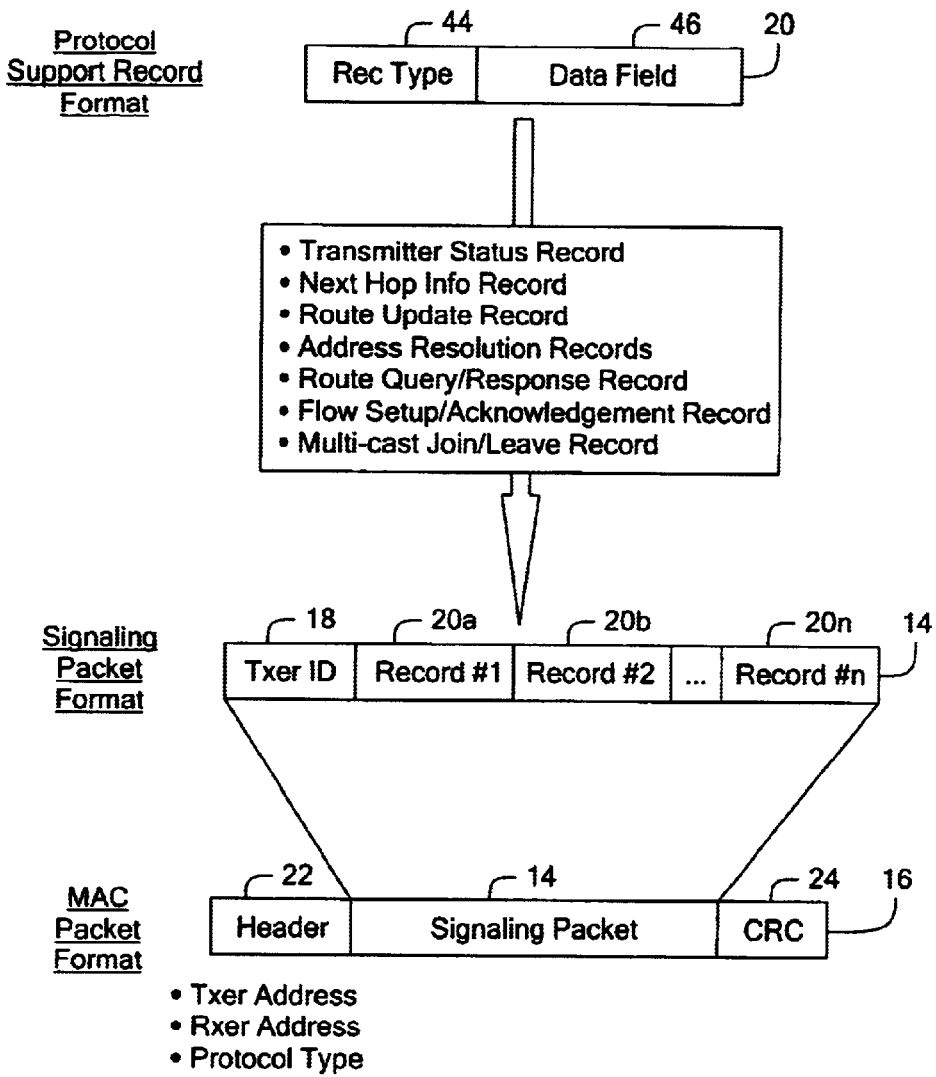
FIG. 2 shows illustrative formats of packets, including signaling packets, Protocol Support Records, and MAC packets, transmitted in the network of FIG. 1.

Referring also to FIG. 2, illustrative formats are shown for a MAC packet 16, a signaling packet 14 which is embedded in a MAC packet, and protocol support records which are embedded in signaling packets for transmission through the network 10. A MAC packet 16 includes a header 22 identifying the transmitter address, the receiver address and the protocol type (e.g., Ethernet), a signaling packet 14 and a cyclic redundancy check (CRC) 24. The protocol of the present invention is compatible with Internet applications, such as TCP/IP applications, and other conventional applications because it resides below the network layer and includes a mechanism for address resolution for the network layer.

Signaling packets 14 contain a transmitter ID field 18 and one or more protocol support records 20a–20n. The transmitter ID field 18 contains both the transmitter address and a transmitter sequence number uniquely identifying the signaling packet. The number of protocol support records contained in a single signaling packet depends on the underlying transmission unit length (e.g., modem capability). Each protocol support record 20a–20n (as shown for illustrative support record 20) contains a record type field 44 followed by protocol specific data 46. Examples of protocol support record types are the Transmitter Status Record (i.e., containing information about the neighbor node transmitting the signaling packet), Next Hop Information Record (i.e., containing information about the specified "next hop" address), and Route Update Record (i.e., containing information which supports QoS routing within the network). All three of these records directly support network backbone creation and maintenance. Other records have been defined to support address resolution and routing functions, including the Address Resolution Notification/Query/Response Record, Route Query/Response Record, Flow Setup/Acknowledgement Record, and Multicast Join/Leave Record.

Use of signaling packets containing protocol support records for establishing and maintaining the wireless network advantageously minimizes the bandwidth necessary for these functions. This is because the signaling packets are small in size (tens of bytes) due to their "record-based" structure, as opposed to the use of "fixed format" packets designed to provide complete update information whether or not it is necessary. Also, signaling packets are forwarded only by backbone nodes rather than, for example, being broadcast by all network nodes ("flooding"). The modularized records allow the protocol to be easily augmented by defining additional records, and associated processing, while maintaining the same signaling packet methodology for protocol information dissemination. Further, since the protocol support records support dedicated functionality, they can be prioritized and selectively purged to accommodate fluctuations in available bandwidth. Finally, because signaling packets are generated at predetermined, periodic rates, node status and routing information is continuously updated resulting in continuous and rapid adaptation to network changes (i.e., as contrasted to disseminating such information only after a network change is detected).

The Transmitter Status Record is used to disseminate status information locally (i.e., it is not forwarded through the network backbone). The Transmitter Status Record includes the transmitter's address and a Transmitter sequence number which is a one byte unique identifier of the record. The Transmitter Status Record further includes the transmitter color which identifies the transmitter's state as category black, category green or category white, the Transmitter degree (TDeg) which specifies the total number of neighbors of the transmitter which are not category black, the transmitter's category black degree (Bdeg) which is a four bit field indicating the number of category black neighbors of the transmitter, and the transmitter's maximum category black degree (BDMax) which specifies the maximum category black degree that the transmitter has received from any of its category black neighbors. A backbone capable specifier of the Transmitter Status Record indicates whether the transmitter is (a) incapable of becoming a category black node, (b) capable of becoming a category black node, or (c) locked into being a category black node (e.g., as may occur by an a priori decision based on the node being substantially static, such as located at an operation center). Even if a node is selected (during the SELECTION, EXPANSION or CONNECTION processes) to become part of the backbone, the node may not be capable of being part of the backbone. For example, the node may not have the necessary power capability to support backbone functionality or the node may elect not to be a backbone member. For example, a node may elect not to be a backbone member if it is anticipated to be located in a battle environment where detection by an enemy of backbone members may be more likely due to their increased transmissions.

The Next Hop Information Record is also used for local information dissemination (i.e., it is not forwarded through the network backbone). This record includes an N/C ID field containing the next hop address, an N/C Specifier, or backbone control field used for next hop control, and a link quality (LQ) field which is used to represent the transmitter's link quality (i.e., the $LQ_{FROM}$ value) which indicates the quality of the link from the next hop address to the transmitter. The N/C ID and N/C Specifier fields are used by the protocol's EXPANSION, CONNECTION, and MAINTENANCE processes described in connection with FIGS. 8, 10, and 11, respectively. In particular, the N/C Specifier is used to associate the N/C ID with an action (i.e., whether (a) the specified N/C ID is being transmitted solely for the purpose of link quality information exchange, (b) the specified N/C ID is being asked to transition its state to black, (c) the specified N/C ID is the transmitter's connection test point (CTP), or (d) the specified N/C ID is one of the transmitter's gateway nodes). For example, processes in which a node "asks" its neighbor to transition to category black (EXPANSION and B-G-G-B CONNECTION) use the N/C Specifier to indicate that the transmitter is requesting the specified neighbor (N/C ID) to transition to category black.

Figure 9:
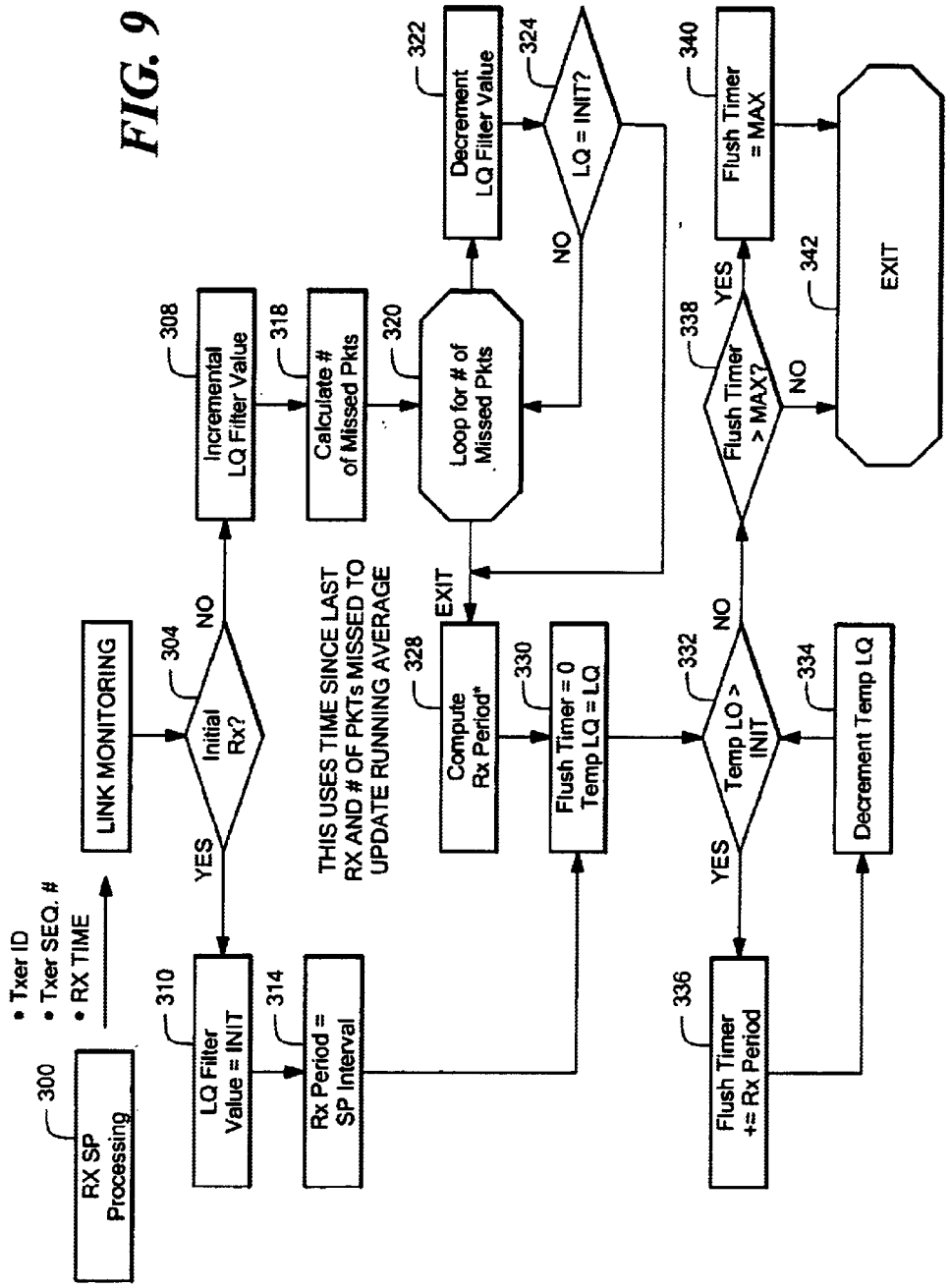
FIG. 9 is a flow diagram illustrating a link quality monitoring process that is performed as a part of processing received Transmitter Status Records.

In the illustrative embodiment, link quality is derived using the loss based LQ estimation algorithm of FIG. 9. It will be appreciated by those of ordinary skill in the art however, that other link quality estimation algorithms may be used. As one example, link quality estimation may be based on maintaining a running average of the rate at which signaling packets are received from neighbors and indicating a degradation in link quality if the signaling packet reception rate decreases by a predetermined amount or to a predetermined level (i.e., a "rate-based" algorithm).

Route Update Records (RURs) are originated by all nodes and are forwarded by category black nodes through the network backbone. RURs contain addressing and Quality of Service (QoS) information that is used to maintain each node's unicast Route Table 100 (see FIG. 3). In particular, the RUR contains the source's MAC address (destination node from a routing protocol point of view), a sequence number which is used to track the uniqueness and regularity of routing updates, a hop count (HC) field which indicates the number of times the RUR has been transmitted, an available bandwidth field indicating the estimated amount of bandwidth available to the destination, a queuing delay field which indicates the anticipated (aggregate) queuing delay to the destination, and an age field which is used to purge records from the network.

The distance that an RUR travels is determined by one of two factors: (a) RURs may be purged by backbone nodes if available bandwidth decreases to the point where record queue input rate exceeds allowable signaling packet generation rates, or (b) the RUR's age field has reached zero (record expiration), whichever occurs first. In the overall bandwidth utilization strategy, record forwarding is lowest priority (i.e., as compared to host, or user-to-user communications). Category black nodes support record forwarding to the degree allowable by their other communications responsibilities. For example, as the system requirement for host communications increases, available bandwidth for record forwarding decreases to the point where incoming (received) records may exceed the node's forwarding capability. This will eventually cause an overflow of the node's Protocol Support Record Queue 60 (FIG. 3), making it necessary to purge lower priority records. If system bandwidth is underutilized, then the rate at which signaling packets are generated and transmitted is a function of how many entries are contained in the Record Queue. In this case, it is the age field of an RUR which will eventually stop it from being forwarded. In the illustrative embodiment, a category black node is required to support RUR forwarding to at least three hops. If a category black node cannot do this, it will transition its state to either category green or category white.

Address Resolution Records support address resolution by permitting conversion of a network layer address (e.g., IP address) to a MAC layer address (e.g., Ethernet). For purposes of address resolution, each node contains an Address Resolution Cache 58 (FIG. 3) in which it stores network address/MAC address pairs as they are received. Address Resolution Records can take one of the following forms: an Address Resolution Notification Record (ARNR), an Address Resolution Query Record (ARQR), or an Address Resolution Response Record (ARRR). The ARNR is used by a source node to "advertise" its network address and contains the source node's network address and MAC address. The ARQR is used to query the network in order to obtain the MAC address for a requested destination's network address. An ARRR is the response to an ARQR (i.e., it is generated by the "target" node specified in the ARQR) and contains the requesting node's network and MAC addresses, as well as the network address for the destination node. The target node fills in the missing MAC address, changes the record type to ARRR, and sends the response back to the requester. Thus, the ARQR and ARRR support a two-way exchange of network/MAC address correlations. In addition, intermediate nodes that overhear these address resolution records add the address pairs to the Address Resolution Cache, thereby "passively" obtaining address resolution information.

ARQRs are time stamped by the originator to support loop detection. As an address resolution entry is inserted into an Address Resolution Cache, its time stamp is also stored. The combination of network address, MAC address, and time stamp uniquely identify the information (and associated record). A cache entry will be purged if a newer record is not received within a system specified, predetermined amount of time. An entry's time stamp is updated when a more recent Address Resolution Record is received for the address pair.

Route Query Records (RQRs) and Route Response Records (RRRs) support "on demand" routing. In particular, the RQR is generated by a node when it seeks to transmit a packet to a destination (with known MAC address) which is not contained in its Route Table. The RQR is similar to the Route Update Record, since it is essentially performing the same function in reverse (i.e., the RUR volunteering the routing information and the RQR requesting routing information). Like the ARQR/ARRR transaction, the RQR/RRR transaction is really the same packet with a modified record type and reinitiailized age/timestamp fields. The RRR is a response to an RQR which provides confirmation of the requested destination's existence and current QoS to the destination. Thus, the RQR and RRR support the identification of route and QoS to a specified destination in "real time."

Multicast Join Records (MJM) and Multicast Leave Records (MLM) contain addressing and control information allowing a node to join or leave a multicast group, as described in connection with FIGS. 12–12E. Suffice it here to say that such records contain the source address (i.e., the route requester's MAC address), the multicast group address, a sequence number which is set by the source to support duplicate detection and purging, the target's gateway address (i.e., the address of the supporting backbone node) and the age of the record as set by the source and updated, or decremented by forwarding nodes.

The Flow Setup and Acknowledgement Records (FSR/FAR) contains address and QoS routing information that supports the protocol's flow establishment process. In particular, these records contain the source address (i.e., the route requester's MAC address), a request sequence number which is set by the source and supports purging of duplicate detections, the forwarding terminus address (i.e., the terminus node supporting inter-zone extended propagation), and the destination address (i.e., the destination for the route query). These records further contain the required bandwidth in bytes/second to the destination, the end-to-end delay requirement and the actual end-to-end delay. The available bandwidth and queuing delay fields are updated as the Flow Setup and Acknowledgement Records are forwarded by backbone nodes.

Each protocol support record's "lifetime" is controlled using one of two aging techniques—explicit aging or subjective aging, with the RURs lifetime additionally controlled by bandwidth utilization, as described above. An explicit packet age field is initialized by the record originator and updated (i.e., decremented) as the record is forwarded through the network backbone. When the age field is decremented to zero, the record is discarded. This mechanism gives the record originator explicit control over how long a record exists. The second mechanism, subjective aging, uses a timestamp field. The timestamp field specifies the time of record origination. This allows receivers to determine how long the record has existed, and based on the protocol functionality, discard the record when it is (subjectively) declared obsolete. In some cases, where a requester of information expects a response within a specified time (e.g. the RQR/RRR), both fields are used to support transactionally oriented protocol logic.

Each node maintains a Protocol Support Record Queue 60 (FIG. 3) in which it keeps records for insertion into signaling packets as they are generated. The Record Queue supports ordering based on record priority. For example, Route Update Records are "more important" than Address Resolution Records. This means that Route Update Records will be inserted before Address Resolution Records in the queue. Note that category black nodes purge their Protocol Support Record Queues on an as needed basis (i.e., when there is no space to queue a new record or they transition to category green or white).

All nodes implement a basic signaling packet generation process that results in packet generation at random intervals. In the illustrative embodiment, a uniform distribution is used in order to compute a random delay between signaling packet generations, with minimum and maximum values representing seconds. It will be appreciated by those of ordinary skill in the art that other techniques are suitable for computing a random delay between signaling packet generations. The minimum and maximum delay values are chosen based on the anticipated degree of dynamic link behavior (i.e., mobility). Lower minimum and maximum delay values are used where there is an expectation of relatively high dynamic link mobility. In this way, signaling packet generation is optimized in order to consistently detect link changes at a rapid rate, for networks having various link dynamics. The signaling packet that is generated during this process contains, at a minimum, a Transmitter Status Record, a Next Hop Information Record, and a Route Update Record. A node is essentially transmitting its own status information and injecting its own RUR into the network as a part of this basic signaling packet generation process.

The result of the random delay between signaling packet generation events is the ability to implement a "tentative" decision for a node to turn black and to thereby prevent saturation of the network with black nodes. As will become apparent, there are various processes, which may result in nodes transitioning to category black (e.g., SELECTION, CONNECTION, and EXPANSION). When a node decides to become category black or is requested to become category black, it sets a flag indicating that it should turn black. If the flag is still set when its next signaling packet is generated, it transitions to category black. However, there are several "flag reset" conditions that can occur before a node actually becomes category black. This arrangement advantageously prevents numerous nodes from triggering off the same condition and turning black simultaneously.

Category black nodes on the other hand, dynamically augment their basic signaling packet generation process with additional signaling packet transmissions. This is necessary to support a category black node's record forwarding responsibility. A category black node's aggregate signaling packet generation rate is based on various factors, including the rate at which signaling packet records are being queued for retransmission and the amount of bandwidth that is available for signaling packet transmission. A black node essentially transmits signaling packets at a rate that maintains an empty record queue until available system bandwidth is exhausted or usurped for user-to-user information transfer. For example, if the signaling packet can hold one record and there are (an average) of 16 records being queued per second, then the node must generate 16 signaling packets per second. The way in which a category black node monitors the bandwidth used for signaling purposes is as follows: the black node knows how many signaling packets it generates in a given interval, which provides a bits/second, or bandwidth measure. This measure is compared to the available bandwidth, as may be governed by the underlying Medium Access Control (MAC) protocol and modem specifications or by the protocol of the present invention.

If the available bandwidth is exceeded, then the rate at which a category black node generates signaling packets is reduced to follow a predetermined system policy. One illustrative system policy includes the following requirements: (1) RURs make a minimum of three hops; (2) RURs are generated at a minimum rate equal to the average signaling packet generation rate; and (3) RQRs and RRRs are transmitted on a priority basis. Note that the three hop minimum requirements of RURs may be used to provide a rule for purging records from a full Protocol Support Record Queue; namely, RURs with a hop count greater than three are eligible to be discarded.

Figure 3:
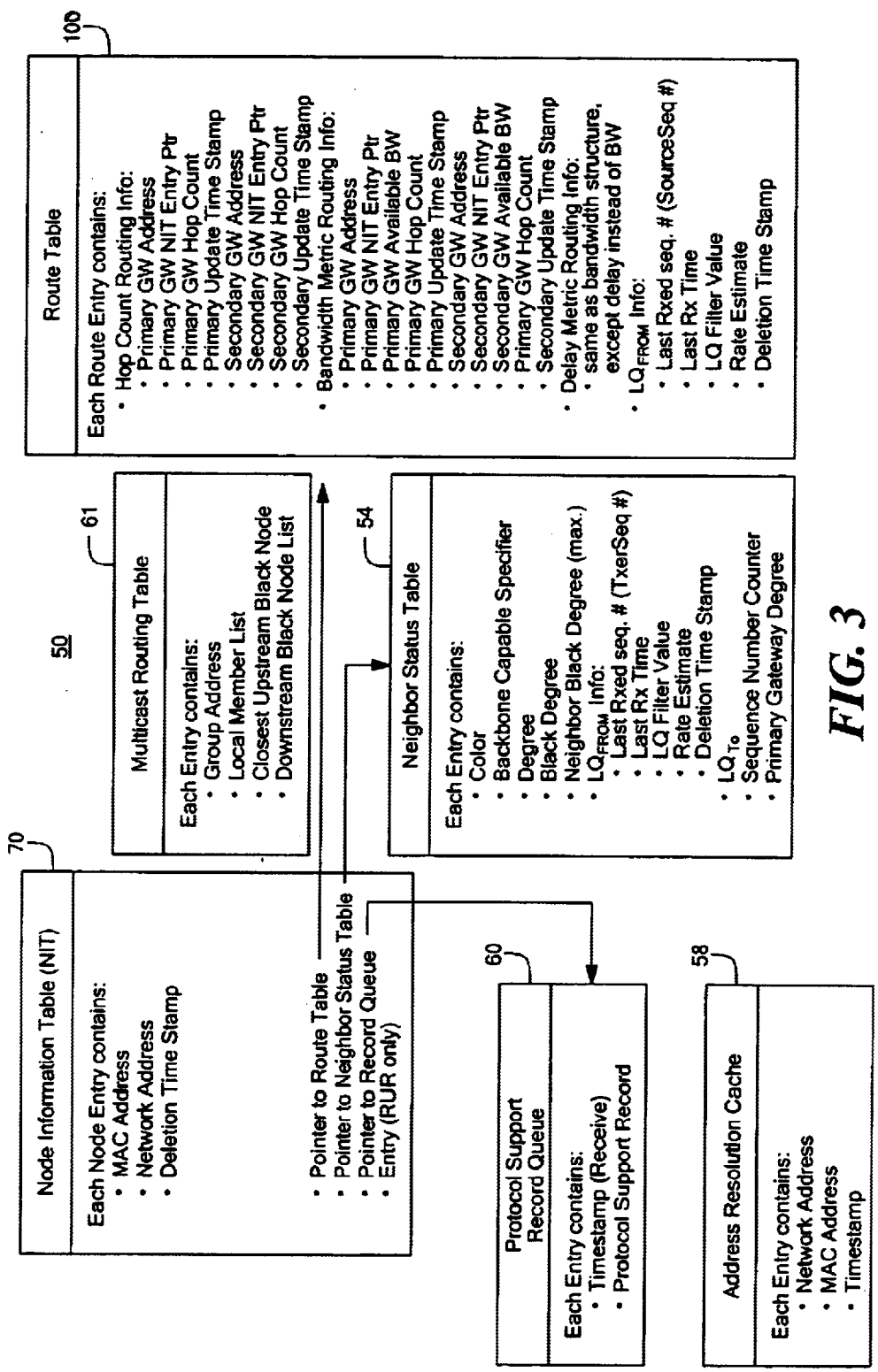
FIG. 3 is a simplified block diagram of data elements of an illustrative mobile node implementing the protocol of the invention.

Referring to FIG. 3, a block diagram of an illustrative mobile node 50 (which may be a black, green or white node) is shown to include a Route Table 100 (FIG. 5), a Node Information Table (NIT) 70 (FIG. 4), a Neighbor Status Table 54 (FIG. 4A), an Address Resolution Cache 58, a Protocol Support Record Queue 60, and a Multicast Routing Table (MRT) 61 which is maintained only by category black nodes, all of which are described below. Also shown in FIG. 3 is a list of illustrative information contained in each of the components. It will be appreciated that one or more of the components shown in FIG. 3, such as the Route Table 100 and the NIT 70 for example, may be combined into a single component.

The Record Queue 60 contains protocol support records that are awaiting insertion into a signaling packet for transmission. Records are queued based on their functional importance (e.g., RURs will be queued before ARNRs since RURs directly support backbone creation and maintenance, whereas ARNRs are viewed as supplemental information).

In addition to these tables, each node maintains several statistics that effect protocol behavior. For example, each node tracks the neighbor that is advertising the largest black degree and the black degree being advertised. This information helps prevent black node saturation. For example, a node that already has the maximum allowable black neighbors will not turn black. In addition, nodes maintain their own Transmitter Status Record data.

Referring also to FIG. 4, every node maintains a Node Information Table (NIT) 70 which contains information about every node from which RURs are received, either directly or through the network backbone. More particularly, the NIT contains an entry for every node discovered via the reception of signaling packets containing Route Update Records.

The NIT 70 includes a field 72 which contains the MAC and network addresses of each node $\mu$ from which RURs are received (the RUR source). The RUR provides the source's MAC address, whereas the network address is derived from ARNR, ARQR, and ARRR reception. The node members $\mu$ of a NIT form a routing "zone," with the receiver defining the "middle" of the zone. As will become apparent, because of the way in which entries are added to and purged from the NIT, the "zone" represented by the NIT members dynamically expands and contracts to adjust to the network topology based on bandwidth utilization. The deletion time stamp field 74 is a value equal to the current time plus a "flush timer" value. The flush timer is maintained by a node in order to purge entries from the NIT which correspond to nodes which have disappeared and is updated during the link quality monitoring process of FIG. 9. The flush timer defines the period within which a subsequent signaling packet reception is expected to occur for the transmitter. If a reception does not occur within this time, the transmitter is removed from the node's database. The NIT's entries are periodically checked to detect deletion timer stamps that have been exceeded by the current system time.

Also provided for each NIT entry is a pointer 78 to a Route Table entry, a pointer 80 to a Neighbor Status Table entry, and a pointer 82 to a Record Queue entry. It will be appreciated by those of ordinary skill in the art that the NIT's Neighbor Status Table Pointer field 80, Route Table Pointer field 78, and Record Queue Pointer field 82 are used to make database management more efficient (i.e., they are an implementation detail and would not exist if the tables were structured as a single entity). The Route Table pointer 78 points to an entry in the Route Table 100 in which one or more routes to the node $\mu$ are contained. The Neighbor Status Table pointer 80 points to an entry in the Neighbor Status Table, if any, corresponding to the node $\mu$. That is, if the node $\mu$ is a neighbor of the receiver, then a corresponding entry exists in the Neighbor Status Table 54. The Record Queue Pointer 82 points to an RUR in the Record Queue 60, if any, pertaining to the respective node $\mu$. This pointer allows a black node which receives a subsequent RUR pertaining to the node $\mu$ to update the RUR in the Record Queue if, for example, the later received signaling packet indicates changes in the QoS metrics contained in the RUR. Thus, only NITs of black nodes utilize the Record Queue pointer field 82.

FIG. 4 shows illustrative NIT entries for node $N_{B8}$ of FIG. 1. Thus, consideration of the NIT 70 reveals that node $N_{B8}$ has received Transmitter Status Records for neighboring nodes $N_{B5}$, $N_{G10}$, $N_{G11}$, $N_{G12}$ and $N_{G13}$ and has received RURs for nodes $N_{B4}$ and $N_{B6}$. Thus, since nodes $N_{B4}$ and $N_{B6}$ are not neighbors of node $N_{B8}$, the Neighbor Status Table pointer 80 for these entries will be null. Receipt of RURs from other, non-listed nodes causes new entries to be provided in the NIT 70.

Referring also to FIG. 4A, an illustrative format of the Neighbor Status Table 54 for node $N_{B8}$ of FIG. 1 is shown. The Neighbor Status Table includes an entry for every node from which Transmitter Status Records are received (i.e., for every neighbor) containing status information derived from received Transmitter Status Records. Thus, in the illustrative example where the Neighbor Status Table 54 is maintained by node $N_{B8}$ of FIG. 1, Neighbor Status Table entries are provided for nodes $N_{B5}$, $N_{G10}$, $N_{G11}$, $N_{G12}$ and $N_{G13}$, listed in that order.

The Neighbor Status Table 54 contains a color field 84 in which the category of the respective node $\mu$ (i.e., white, green, or black) is specified. A backbone capable specifier 86 specifies the node's backbone eligibility status (i.e., whether the node is eligible to become a black node, is not eligible to become a black node, or is "locked" into being a black node). The degree field 88 specifies the number of non-black neighbors of the node $\mu$. The black degree field 90 specifies the number of category black neighbors of the node p. The maximum black degree field 92 specifies the maximum number of category black neighbors of any of the neighbors of the listed node.

The $LQ_{FROM}$ field 94 contains the last received transmitter sequence number 94a, the time of the last received signaling packet in field 94b, a link quality (LQ) filter value 94c, a signaling packet receive rate estimate (i.e., Rx Period) 94d, and a deletion time stamp 94e. The last received transmitter sequence number 94a is provided in a signaling packet header 18 (FIG. 2) and uniquely identifies the signaling packet which caused the particular Neighbor Status Table entry to be last updated. The last received transmitter sequence number 94a is used to track the regularity of routing updates (i.e., the last received transmitter sequence number of signaling packets should increase sequentially according to the sequence of receipt of signaling packets). The deletion time stamp is used to update a node's NIT and other tables by removing nodes which are no longer heard. The deletion time stamp 94e, LQ filter value 94c, and rate estimate 94d are updated by the LQ monitoring algorithm shown in FIG. 9, which requires as inputs the last received transmitter sequence number 94a, the time of the last received signaling packet 94b, and the transmitter ID from the signaling packet header 18, as will be discussed.

The $LQ_{TO}$ field 96 contains the LQ value from received Next Hop Information Records in which the receiving node is specified as the next hop address (i.e., the transmitter is telling the receiver its $LQ_{FROM}$ value for the next hop address). The combination of $LQ_{FROM}$ and $LQ_{TO}$ result in two-way link quality knowledge. Note that only category black nodes provide two-way link quality feedback, so the $LQ_{TO}$ field 96 is maintained only for category black neighbors. Also contained in the Neighbor Status Table is a sequence number counter field 98 which supports the CONNECTION process, as will be described. Since category black nodes do not perform the CONNECTION process, this field is unused for category black neighbors.

Link quality plays an important role in the protocol's backbone creation and maintenance functionality. First, link quality is verified prior to modifying statistics based on a node. That is, certain statistics are maintained by each node (e.g., the degree of each Neighbor Status Table entry). Before a node p is included in a statistic, it is determined whether the link quality between the receiver and the node $\mu$ is acceptable. Further, prior to a node transitioning to category black, whether by its own determination such as in the case of backbone SELECTION, or in response to a request from another node, such as in the case of backbone EXPANSION, link quality is verified. Finally, link quality is used during the EXPANSION process as described in conjunction with FIG. 8. Use of link quality in these ways ensures fast adaptation to network changes based on reliable communication links between nodes.

A Primary Gateway Degree field 99 of the Neighbor Status Table contains a value indicating the number of times that the respective node appears as a primary gateway in the Route Table. This statistic is updated as the Route Table is updated, as discussed below.

Figure 5C:
FIG. 5C shows exemplary "Widest-Shortest" Path routing information contained in the Route Table of node $NN_{G8}$ of FIG. 1.
Figure 5D:
FIG. 5D shows exemplary "Fastest-Shortest" Path routing information contained in the Route Table of node $N_{G8}$ of FIG. 1.

Referring to FIG. 5, an illustrative Route, or Routing Table format is shown. The Route Table 100 contains an entry for each NIT entry and both tables contain information related to processing received RURs. Each Route Table entry contains four types of information: (1) RUR receive quality information 102 as shown in FIG. 5A, (2) routing information based on a "shortest-widest" routing policy as shown in FIG. 5B; (3) routing information based on a "widest-shortest" routing policy as shown in FIG. 5C; and (4) routing information based on a "fastest-shortest" routing policy as shown in FIG. 5D.

Referring to FIG. 5A, the RUR receive quality information 102 contains quality information that represents the regularity and (average) rate for received RURs. For indirect nodes (i.e., nodes that do not have a Neighbor Status Table entry), this field's deletion time stamp is used for NIT maintenance. More particularly, the Route Table portion 102 includes a last received sequence number field 110, a last receive time field 112, an LQ filter value 114, a rate estimate field 116, and a deletion time stamp field 118, each of which is as described above for corresponding fields 94a, 94b, 94c, 94d, and 94e, respectively, of the Neighbor Status Table. The difference between the link quality information provided in the RUR receive quality portion 102 of the Route Table 100 and the $LQ_{FROM}$ fields 94 of the Neighbor Status Table 54 is that the Neighbor Status Table contains receive link quality information pertaining to the link from the record transmitter to the receiving neighbor; whereas the Route Table contains receive link quality information based on a multi-hop record and driven by RURs. Thus, the receive link quality information contained in the Route Table specifies link quality from the RUR source to the RUR transmitter from which the RUR was received. The entries of the illustrative Route Table portion 102 of FIG. 5A are for node NBS of FIG. 1.

Referring to FIGS. 5B, 5C, and 5D, each such routing information portion 104, 106, 108, respectively, of the Routing Table 100 contains the same general information, albeit with the entries selected based on different routing policies. The provided information includes: a primary route 120 and a secondary route 122, as shown. The primary route 120 contains a gateway address 124, a pointer to the primary gateway's NIT entry 126, a primary gateway hop count 128 (i.e., the number of hops made by a packet traveling to the destination along the particular route), a QoS measure 130, and a primary deletion time stamp 132 (i.e., which specifies the time remaining before the particular route becomes stale and is removed from the Route Table). The time stamp is generally set to a predetermined value which is a function of the rate at which signaling packets are expected to be generated and is reset when a route is updated. Thus, if a particular route is not updated within the expected time interval, the route is no longer viable. The QoS measure 130 specifies the available bandwidth to the destination in the case of the "Shortest-widest" and "Widest-Shortest" routing policies (FIGS. 5B and 5C) and contains the forwarding delay in the case of the "Fastest-Shortest" routing policy (FIG. 5D).

Fields 140, 142, 144, 146, and 148 contain the same information as fields 124, 126, 128, 130, and 132, respectively, but for a secondary route to the destination. That is, the secondary route to each destination node contains the same information as the primary route, but simply provides an alternative route to the destination in the event that the primary route is not available.

The information provided in the "Shortest-Widest" Routing Information portion 104 of the Route Table 100 (FIG. 5B) maintains the two "best" gateway (next hop) addresses through which the destination can be reached according to the "Shortest-Widest" routing policy. The information provided in the "Widest-Shortest" Routing Information portion 106 of the Route Table 100 (FIG. 5C) maintains the two "best" gateway (next hop) addresses through which the destination can be reached according to the "Widest-Shortest" routing policy. The information provided in the "Fastest-Shortest" Routing Information portion 104 of the Route Table 100 (FIG. 5D) maintains the two "best" gateway (next hop) addresses through which the destination can be reached according to the "Fastest-Shortest" routing policy. Shortest-Widest Path routing identifies the minimum hop count route and uses available bandwidth (maximum) as the discriminator for routes with equivalent available bandwidth. Widest-Shortest Path routing identifies the maximum (widest) bandwidth route and uses hop count (minimum) as the discriminator for routes of equal available bandwidth. Fastest-Shortest Path routing identifies the minimum delay route and uses hop count (minimum) as the discriminator for routes of equal delay. Note that all secondary routes based on all three routing policies are Null since node $N_{BS}$ does not have alternate connectivity through the existing backbone to these nodes.

Signaling Packet Processing Common to all Nodes (Database Updating)

A received signaling packet 14 (FIG. 2) contains a header 18—transmitter address and sequence number - and protocol support records 20a–20n. Initial processing of a signaling packet includes the following steps. First, the receiver's NIT 70 is searched to find the transmitter's entry. If an entry is not found, one is created and initialized for the transmitter. In addition, a Neighbor Status Table entry is created and initialized for the transmitter. Next, the Neighbor Status Table entry's link quality information $LQ_{FROM}$ is updated using the link quality monitoring algorithm of FIG. 9. Lastly, the transmitter's Neighbor Status Table deletion time stamp is updated (computed by link quality monitoring algorithm).

Protocol Support Record Processing

Protocol support record processing parses each record 20a–20n from the signaling packet 14 and performs the processing described below. Note that this discussion pertains to processing that is common to all nodes. Color specific processing is discussed below.

Transmitter Status Record (TSR) Processing

Received TSRs are used to maintain the Neighbor Status Table 54 (FIG. 4A). As is apparent from the above discussion of the TSR and the Neighbor Status Table fields, there is substantially a one-to-one correspondence between the TSR contents and Neighbor Status Table's fields. TSR processing stores the current status values (some color specific processing checks for certain types of changes before updating the entry's fields) and updates the following status variables: (1) degree—number of non-black neighbors the node has; (2) black degree—number of black neighbors the node has; (3) neighbor black degree maximum—the maximum black degree value being advertised by the node's black neighbors; and (4) neighbor black degree address—the node address advertising the neighbor black degree maximum value. As noted above, the Neighbor Status Table's $LQ_{FROM}$ information 94 (FIG. 4A) is updated as a part of the initial signaling packet processing.

Next Hop Information Record (NHR) Processing

All nodes perform the following processing upon receipt of a Next Hop Information Record. The NHR is used to exchange link quality information and support the backbone creation and maintenance processes. All nodes, upon receipt of a NHR, check the next hop address field (N/C ID). If this field is equal to the receiver's address, then the NHR's LQ filter value is put into the transmitter's Neighbor Status Table entry $LQ_{TO}$ field. The $LQ_{TO}$ value indicates how well the neighbor is hearing his transmissions from the receiver. Setting the NHR's next hop address, LQ, and Backbone Control fields, as well as processing the Backbone Control field (N/C Specifier) are discussed below in the "Color Specific Processing" section.

Address Resolution Notification, Query, and Response Record (ARNR, ARQR, ARRR) Processing The protocol of this invention resides below the network layer, thereby creating the need for a network-to-link address resolution protocol. When the network layer attempts to communicate with another network layer, the destination network address must be translated to a link (or MAC) layer address to facilitate packet transfer across the underlying physical channel. This process is referred to as address resolution, and is supported by address resolution records.

Each node maintains an Address Resolution Cache 58 containing an entry for each network/MAC address pair, and a timestamp field specifying the time at which this entry is considered invalid (stale). The ARNR provides a low rate advertisement of a node's network and MAC addresses. This record is low priority and allowed to "roam" the network for fairly long periods of time (minutes). Like the previously discussed RUR, it is age limited to ensure a limited (deterministic) lifetime. Loop termination is achieved by adding the received record's age value to the current time. This value is stored in the cache entry, and represents the time after which records for this address pair are no longer considered to be duplicate.

The ARQR and ARRR records support a query/response transaction. If a requested destination network address does not exist in the cache 58, an ARQR is generated and queued for transmission. Since this process is typically the precursor to route identification, ARQR and ARRR records are considered to be one priority level below RQR and RRR records. The ARQR is forwarded until it is received by the specified destination, or a black node that has a cache entry containing the specified destination network address. An ARRR is generated in response to an ARQR by changing the ARQR's record type to ARRR, filling in the destination MAC address field, and resetting the age field to the original ARQR value (current time minus timestamp plus age).

Route Update Record (RUR) Processing

Figure 6:
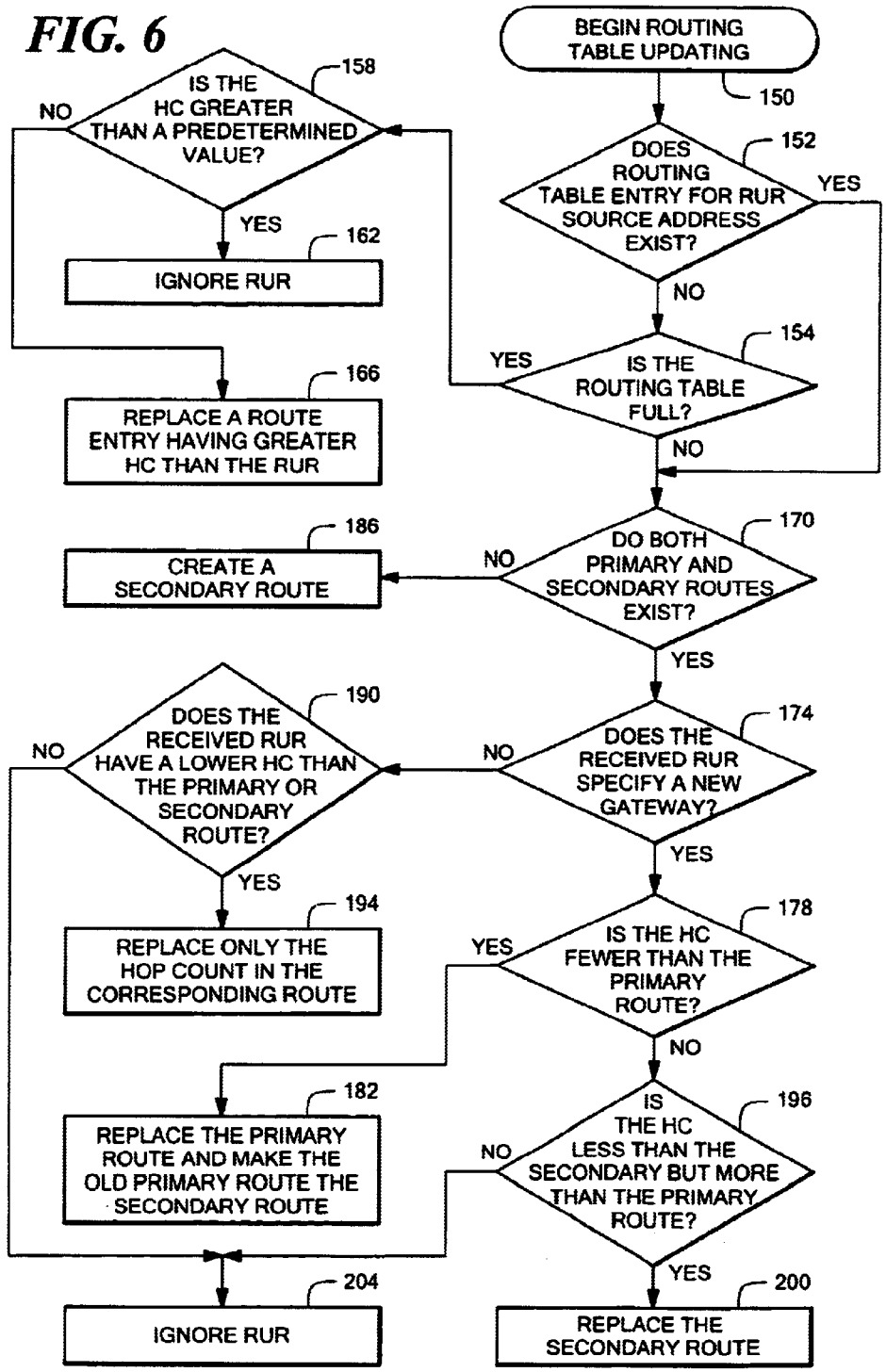
FIG. 6 is a flow diagram illustrating the process by which Route Tables are updated.

All nodes (regardless of their color) perform the same process to maintain its Route Table 100 (FIG. 3), as illustrated by FIG. 6. Route Table maintenance processing is triggered by receipt of an RUR. The Route Table contains routing information that represents several Quality of Service (QoS) criteria, such as "Shortest-Widest Path" (FIG. 5B), "Widest-Shortest Path" (FIG. 5C), and "Fastest-Shortest Path" (FIG. 5D).

In step 150, Route Table update processing commences upon receipt of an RUR. Recall-that the RUR contains the address of the destination node (the RUR's source address) to which the RUR's routing information pertains. The RUR's routing metric information includes hop count HC which is the number of times the RUR has been transmitted, QoS routing metrics of interest (available bandwidth and aggregate delay), and an age field. From the receiver's point of view, the RUR transmitter is the gateway (1st hop) supporting a specified level of QoS (RUR routing metric values) to the specified destination (RUR source address). The receiver's Route Table update logic is responsible for determining if the RUR's routing information represents an improvement over its current entries. If so, the Route Table is updated appropriately. The first step 152 is to determine whether a Route Table entry already exists for the RUR source address (destination with respect to the Route Table). If an entry does not yet exist, a new entry is created in the Route Table and initialized with the RUR's information. Specifically, the LQ monitoring function of FIG. 9 is performed to initialize the entry's $LQ_{FROM}$ information and the primary gateway information for all routing metrics is initialized to the RUR transmitter and associated metric values contained in the RUR.

Note that some implementations may be memory limited and require logic that deals with an overflow situation. For example, if it is determined in step 154 that the Route Table is full, then the processing evaluates the importance of the new RUR with respect to the "least valuable" existing Route Table entry. This is typically a system specific policy decision, such as may be based on hop count. In particular, if it is determined in step 154, that the Routing Table is full, then it is next determined in step 158 whether the hop count HC specified in the received RUR is greater than a predetermined value. If the hop count HC is greater than the predetermined value, then the received RUR is ignored in step 162. Alternatively, a route in the Routing Table having a hop count HC greater than the hop count specified in the RUR is replaced in step 166. With this particular arrangement, Route Table overflow conditions result in shorter routes replacing longer routes.

If a Route Table entry already exists for the RUR source and the Route Table is not full, the Route Table update logic determines if any of the RUR's routing metric information represents an improvement over the existing entry's routing information. The logic can be described generally as follows. If the RUR transmitter is already listed as the primary gateway for any of the routing metrics, then the entry is updated with the RUR metric data and it is verified that the primary gateway route is still 'better' than the secondary route. If the secondary route is now better, then the primary and secondary route information is switched. If the RUR transmitter is already listed as the secondary gateway for any of the routing metrics, then the entry is updated with the RUR metric data and it is verified that the primary gateway route is still 'better' than the secondary route. If the secondary route is now better, then the primary and secondary route information is switched. Finally, if the RUR transmitter is not currently listed as the primary or secondary gateway, and if the RUR represents an improvement over the existing primary gateway entry, then the primary gateway information is moved to the secondary fields and the RUR transmitter and associated metric data from the RUR is written into the primary gateway fields, Otherwise, if the RUR represents an improvement over the existing secondary gateway entry, then the RUR transmitter and associated metric data from the RUR is written into the secondary gateway fields.

The three routing strategies implemented by the described protocol—Shortest-Widest Path, Widest-Shortest Path, and Minimum Delay (i.e., Fastest)—Shortest Path—are evaluated as follows. For Shortest-Widest Path routing, a route is considered better if its hop count is less than the existing route's hop count. For routes of equivalent hop count, the route with greater available bandwidth is considered better. For Widest-Shortest Path routing, a route is considered better if its available bandwidth is greater than the existing route's available bandwidth. For routes with equivalent available bandwidths, the route with smaller hop count (Shortest Path route) is considered better. Note that available bandwidth (Widest Path) routing assumes and relies on an underlying MAC layer protocol for bandwidth availability status, either in the broadcast sense or on a neighbor basis. For Minimum Delay-Shortest Path routing, a route is considered better if its delay is less than the existing route's delay. In the event that both routes have equivalent delays, the Shortest Path route is considered better.

Delay represents the aggregate anticipated forwarding delay to the destination. Each node measures the average processing and queuing delay that packets experience as they are forwarded. Here again, queuing strategies are affected by the underlying MAC (e.g., an Ethernet MAC layer is a single queue FIFO mechanism, whereas TDMA based systems may segregate time into disjoint channels, implement multiple queues to support packet transmission, and incur additional delays due to packet fragmentation).

The illustrative process of FIG. 6 is specific to the Shortest-Widest routing policy (i.e., better routes have lower hop counts). Route Table updating logic similar to that illustrated in FIG. 6 is performed for each routing metric. Thus, a first further series of process steps is performed, which are substantially similar to the steps of FIG. 6, but which determine better routes based on higher bandwidth (i.e., widest-shortest routing) and a second series of steps are performed which are substantially similar to the steps of FIG. 6, but which determine better routes based on shorter delays (i.e., fastest-shortest routing).

If a Route Table entry for the RUR source exists and the Route Table is not full, then it is determined in step 170, whether both primary and secondary routes are contained in the Routing Table for the RUR's source (i.e., the routing destination). If the Routing Table does not contain both routes to the destination, then a secondary route is inserted into the Table based on the information contained in the RUR. Alternatively, if both primary and secondary routes to the destination are contained in the Routing Table, then it is next determined in step 174 whether the received RUR specifies (by way of the RUR's transmitter) a new gateway to the destination for any routing metric. If there is a new gateway specified by the RUR, then it is determined in step 178 whether the RUR specifies a hop count less than the hop count contained in the primary route. If the RUR specifies a lower hop count, then the primary route is replaced with the route specified in the RUR, the old primary route becomes the secondary route, and the old secondary route is discarded in step 182.

Alternatively, if the RUR does not specify a lower hop count, then it is determined in step 196 whether the RUR specified hop count is less than that contained in the secondary route but more than the primary route. If the RUR specified hop count is less than the secondary route but more than the primary route, then the secondary route is replaced with the route specified in the RUR in step 200. If the hop count is more than the hop count of the secondary route, then the RUR is ignored in step 204.

If the received RUR does not specify a new gateway in step 174, then it is determined in step 190 whether the route in the RUR has a lower HC than either the primary or secondary route to the destination as contained in the Routing Table. If the RUR specifies a lower hop count than either of the routes contained in the routing table, then the hop count for the corresponding route in the Routing Table is replaced.

Alternatively, the RUR is ignored in step 204.

Whenever a primary gateway address is removed from the Route Table 100, the removed address's primary gateway degree field 99 in the removed address's Neighbor Status Table entry (FIG. 4A) is decremented. Whenever a primary gateway address is added to the Route Table 100, the new primary gateway's Neighbor Status Table entry primary gateway degree field 99 is incremented.

Removal of a node from the NIT (deletion time stamp expiration) triggers removal of the node's Route Table entry, and all gateway entries containing the node's address. If the node's address is contained in a primary gateway field, then the primary gateway information is replaced with the secondary gateway information and the secondary gateway information is reset. If the node's address is contained in the secondary gateway field, the entry's secondary gateway fields are reset.

Routing Information Server Functionality and 'On Demand' Route Identification (Route Query/Response Record Processing)

The Routing Table 100 contains a node's view of reachable destinations and the QoS that can be supported to them. Besides maintaining the node's unicast Route Table 100, the routing function, or route processing routine acts as "a unicast routing information 'server'" for higher layer protocols (i.e., the network layer). It provides a query/response interface that allows an external function, or application to request route information by specifying the destination address and type of QoS. If the destination is found in the Route Table, the destination's routing information (QoS metric specific) is provided to the requesting entity.

If the destination is not found in the Route Table, then a Route Query Record (RQR) is generated. The requesting function is notified that a search is being conducted for the requested destination and QoS, and may also be given the worst case delay for the search to complete. The requesting function either receives route information during this period (i.e., a successful RQR/RRR transaction) or notification that the destination could not be found. In the latter case, the requesting fiction may opt to query for the destination again which causes the search period to be increased, since the routing function keeps a cache of failed route queries and the associated search period.

White and green nodes modify their signaling packet generation process when an RQR is queued. In particular, they transmit the RQR as a part of their basic signaling packet generation process if the next signaling packet generation is scheduled to occur within a system specific, predetermined time. Otherwise, such nodes perform signaling packet generation immediately. White and green nodes do not generate RRRs; rather, their backbone node neighbor (s) generate the RRR. Category black nodes queue RQRs and RRRs with a higher priority than any other record type, except a Transmitter Status Record or a Next Hop Information Record that is supporting one of the time sensitive backbone creation processes (e.g., a node announcing that it has transitioned to category black). This means that a black node's own RQR and RRR only competes with RQRs and RRRs it is currently forwarding for other nodes.

The RQR's source, destination, QoS metrics, time stamp, and age fields are initialized by the source node. Source and destination address remain fixed for the entire RQR/RRR round trip messaging process. The QoS metrics are updated as the RQR is forwarded through the network. Hop Count is incremented each time the RQR is forwarded. The RQR's available bandwidth metric represents the minimum amount of available bandwidth for the route. Black nodes compare their available bandwidth to that specified in the received RQR. If their available bandwidth is greater than or equal to the RQR's value, the RQR value remains unchanged.

Otherwise, the black node overwrites the RQR's value with its own available bandwidth. As previously discussed, each node measures its average forwarding delay (processing plus queuing delay). The RQR's delay metric represents the aggregate average forwarding delay for the route. Black nodes add their measured delay to the value in the received RQR.

The RQR's timestamp and age fields are used to control the lifetime of an unsuccessful RQR, and bound the round trip RQR/RRR messaging process. If the RQR is received by the specified destination (backbone node only) or a backbone neighbor of the specified destination, it is converted to an RRR and sent back with an age equal to the initial value that was set by the RQR source. This is achieved by subtracting the time stamp from the current time, and adding the age.

RQRs and RRRs are age limited (i.e., the age field is decremented by forwarding nodes as the record is forwarded). The same process that a node uses to compute its average forwarding delay routing metric provides the specific delay that a packet has been held by the node. This value is subtracted from the RQR's or RRR's packet age at the time the record is transmitted (i.e., put into a signaling packet). If the result of this subtraction is a value less than zero, then the age field is set to zero which guarantees that it will be discarded by any node that receives it.

Figure 7:
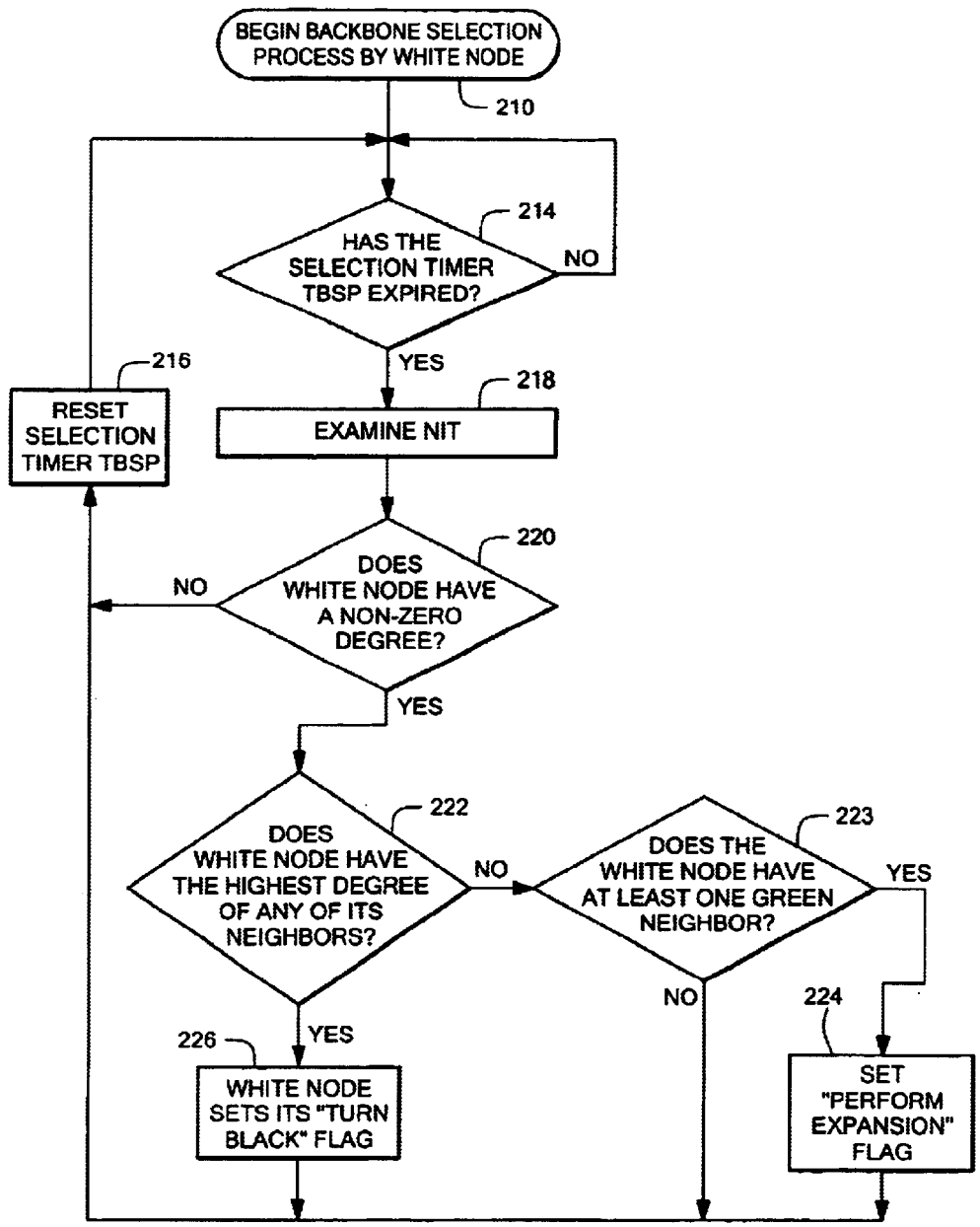
FIG. 7 is a flow diagram illustrating a backbone SELECTION process according to the invention.
Figure 8:
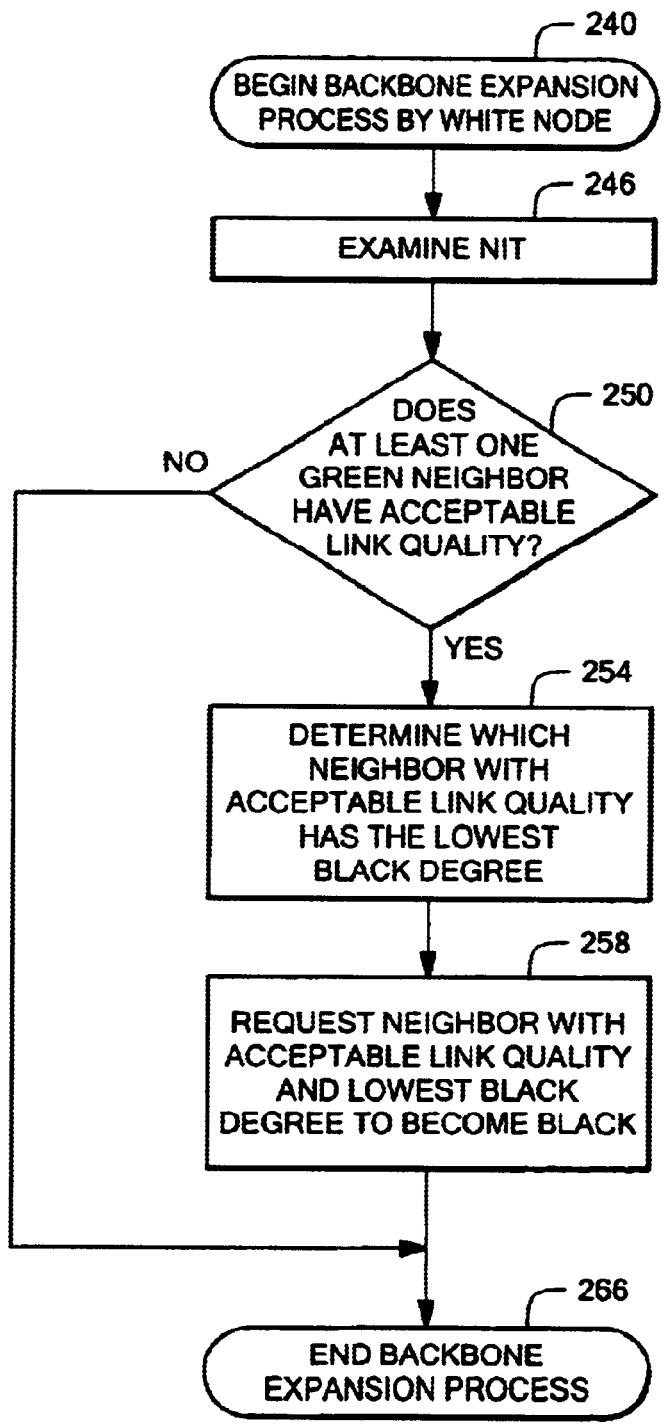
FIG. 8 is a flow diagram illustrating a backbone EXPANSION process utilizing link quality monitoring according to the invention.

Color Specific Processing
Category White Node Processing
Backbone Selection Process Timer (TBSP) Processing White nodes perform the SELECTION and EXPANSION processes to become a part of the fully connected network (i.e., to become a black or green node). SELECTION is the process by which a white node selects itself to become a backbone (black) node, and is triggered by expiration of a standby or selection timer TBSP, as illustrated in FIG. 7. A white node that fails SELECTION evaluates the possibility for EXPANSION and sets a "Perform EXPANSION" flag if it determines that EXPANSION may succeed. EXPANSION is the process by which a white node asks a category green neighbor to become a backbone node, thereby making the white node a green node. The actual EXPANSION process, illustrated in FIG. 8, is performed when a white node's signaling packet generation event occurs with its "Perform EXPANSION" flag is set. The information supporting these two processes—color, degree, black degree, neighbor black degree (max.), and receive LQ—is contained in the Neighbor Status Information Table 54.

Referring to the SELECTION process shown in FIG. 7, the selection timer $T_{BSP}$ is designed to allow a white node enough time to receive status information from its neighbors before making a SELECTION or EXPANSION decision (i.e., the timer is set to the maximum signaling packet generation period). When the timer TBSP expires in step 214, a white node performs the SELECTION process. From a network point of view, nodes with good connectivity (the most neighbors) represent more routing choices and are considered the most desirable backbone nodes. A node performing SELECTION, therefore, selects itself as a backbone node if it has better connectivity than any of its neighbors in step 222. Additionally, this comparison is only performed with respect to non-black neighbor nodes, the existence of which is determined in step 220.

If a node selects itself to become a backbone node because it is determined to have better connectivity than any of its neighbors in step 222, then it will set the "Turn Black" flag indicating that it has passed the SELECTION process in step 226. This flag is checked when a white node's signaling packet generation event occurs, as discussed below. There are several cases where the selection timer and turn black flag may be disabled or reset before signaling packet generation takes place, as is also discussed below.

If a node fails the SELECTION process, but has a non-zero number of green neighbors as is determined in step 223, then it sets the "perform EXPANSION" flag in step 224 of FIG. 7. EXPANSION is performed when a white node's signaling packet generation event occurs, as follows.

Referring also to FIG. 8, the EXPANSION process is illustrated by which a category white node which failed to transition to category black during the SELECTION process may be able to select its "best" category green neighbor to become category black and become category green itself. The EXPANSION process commences upon generation of a signaling packet with the "perform EXPANSION" flag set.

In step 246, the category white node examines its NIT 70. In particular, and as indicated in step 250, it is determined from the Neighbor Status Table entries pointed to by the NIT entries whether the category white node has at least one neighbor with a link quality greater than a predetermined, acceptable level. This is determined by examination of the receive link quality field 94. If there is such a neighbor listed, then it is next determined in step 254 which such neighbor (assuming there to be more than one neighbor with acceptable link quality), has the least category black category neighbors. If no such neighbors exist, then the process terminates in step 266.

In step 258, the category white node requests that its neighbor having acceptable link quality and the lowest category black degree become category black. This is achieved by placing that neighbor's address in the N/C ID field of a Next Hop Information Record, computing the neighbor's transmitting link quality according to the process of FIG. 9 and placing the link quality value into the Next Hop Information Record, and setting the N/C Specifier field to specify that the neighbor is being asked to transition to category black. Thus, upon receipt of a Next Hop Information Record with the receiver's address in the N/C ID field and the N/C specifier requesting that the receiver transition to category black, the receiver verifies link quality with the transmitter by comparing the link quality value the received Next Hop Record to a predetermined acceptable level, computing the quality of the link from the category white node, and comparing this receive link quality to the predetermined acceptable level. If the category green receiver determines that the two-way link quality is acceptable, it sets its "turn black" flag and the EXPANSION process terminates in step 266.

The category white node waits until its previously green neighbor transmits a TSR indicating that it has transitioned to category black. Thereafter, the white node becomes category green upon generation and transmission of the next signaling packet. More particularly, when a category white node generates a signalling packet, it determines if its "turn black" flag is set and, if it is, the white node sets its color to black, disables the selection timer and resets the "turn black" and "perform EXPANSION" flags. The result of the EXPANSION process is a network that is made up completely of category green and category black nodes.

Received Signaling Packet Processing

White nodes perform processing on received Transmitter Status Records and Next Hop Information Records that is specific to their color in order to control flags associated with the SELECTION and EXPANSION process.

After the received signaling packet has been processed by the logic common to all nodes (i.e., database update) as described above, a white node performs the following processing: (1) If the transmitter's color is black, and the transmitter's Neighbor Status Table entry contains $LQ_{FROM}$ and $LQ_{TO}$ values that are acceptable (above a predetermined threshold), then the white node resets its SELECTION and EXPANSION flags, disables the selection timer, and transitions to green; and (2) performs a set of checks to determine if a local event has occurred that dictates resetting the node's SELECTION and EXPANSION flags. In particular, the following conditions result in the selection timer, "turn black" flag, and "perform EXPANSION" flag being reset: (a) a new black neighbor has been detected; (b) an EXPANSION request has been received (i.e., the transmitter is white and the transmitted signaling packet contains a Next Hop Information Record with the backbone control field indicating a request that the receiver become category black; or (c) a CONNECTION request has been received (i.e., the transmitter is green and the transmitted signaling packet contains a Next Hop Information Record with the backbone control field indicating a request that the receiver become category black, or a "turn black request"). A white node also maintains a counter for each node (the Neighbor Status Table's general purpose timer/counter) that is incremented each time a CONNECTION or EXPANSION process is initiated (the transmitter's Neighbor Status Table entry's counter) with the address. After a specified threshold value, overheard requests from the transmitter will be ignored (i.e., they will not cause a reset of the node's timer and flags).

Signaling Packet Generation Processing

A white node checks its SELECTION and EXPANSION flags before generating a signaling packet. The following processing is performed based on the setting of these flags. First, the "turn black" flag is checked and if set, the white node resets its SELECTION and EXPANSION flags, disables the selection timer, generates a signaling packet, and transitions to the black state. The signaling packet contains, at a minimum, a Transmitter Status Record (with the color field set to black), a Route Update Record (with itself as the source), and a Next Hop Information Record (advertising its CTP or one of its gateways). If the "turn black" flag is not set, the "Perform Expansion" flag is checked. If set, the white node searches its Neighbor Status Table for the 'best' EXPANSION candidate according to the following information contained in each neighbor's entry: (a) the color field is set to green; (b) the LQ value contained in the $LQ_{FROM}$ field is above the predefined threshold for acceptable link quality; (c) the counter field is less than a specified threshold; (d) the neighbor black degree (max.) is less than the maximum allowable black neighbors; and (e) the black degree is less than the other potential candidates (neighbors that have passed criteria a–c). If this search yields an EXPANSION candidate, a Next Hop Information Record is queued (instead of the normal record that supports LQ exchange with black neighbors) containing the candidate's address (next hop address) and N/C Specifier field set to "turn black request." In addition, the white node increments the candidate's counter field, resets the "perform EXPANSION" flag, resets the selection timer, stores the candidate's address (herein referred to as the "standby address"), and sets a "standby timer" to a predetermined value. The standby address and timer are used to preclude a node from engaging in redundant or parallel SELECTION and/or EXPANSION processes.

Standby Timer Expiration Processing

The standby timer and associated standby address are used to allow a pending request, such as an EXPANSION request, to complete before the white node initiates another network protocol related process. For example, a white node that sends an EXPANSION request expects to hear the next hop address, specified in the request, transmit a Transmitter Status Record identifying itself as black (an implicit acknowledgement of the request). The standby address and standby timer are used to give the next hop address time to process, and respond to, the request before the white node tries something else. If the standby timer expires, it means that the request failed and the white node is free to try something else when its EXPANSION timer expires. Upon standby timer expiration, the white node resets the standby address.

Link Quality Estimation

Referring to FIG. 9, a process is illustrated by which link quality is monitored by all node categories. The process is described in connection with a receiver monitoring the quality of the link from a transmitter (neighbor) to itself (i.e., receive LQ). However, two-way link quality monitoring is also supported between a black node and its neighbors. Black nodes use the Next Hop Information Record to disseminate receive link quality to neighbor nodes, thereby providing neighbors with 2 way link quality information. Link quality feedback (i.e. Next Hop Information Record generation) is triggered by the receipt of a neighbor's Next Hop Information Record identifying the black node as the next hop address.

Link quality monitoring commences with receipt of a signaling packet in step 300, following which it is determined in step 304 whether the signaling packet identifies a transmitter from which signaling packets have previously been received. This determination is made by comparing the transmitter ID field of the received signaling packet with the NIT of the receiver. If the transmitter ID is listed as a destination node in the NIT of the receiver, then it is determined that the receiver previously received a signaling packet from the transmitter and step 308 is next performed. Alternatively, if the transmitter ID is not listed in the NIT, then the received signaling packet is an initial receipt and step 310 is next performed.

In step 310, an LQ Filter Value of a sequential hypothesis filter stored in the receiver is set to a predetermined value, INIT. The LQ Filter Value is a qualitative measure of the quality of the link from the transmitter to the receiver. The LQ filter value is incremented for each received packet and decremented for each missed packet. Missed packets are detected using the transmitter sequence number (last received and current received sequence numbers). In one illustrative embodiment the increment and decrement values can be set for an expected link throughput (i.e., setting the increment and decrement values to 1 and 3 respectively will result in a stable LQ value if the link is operating at 75%). Links that perform better than the nominal expected value will result in an increasing LQ value and vice versa. The link quality algorithm also computes an estimate of the transmitter's signaling packet transmission rate, the Rx Period to provide the rate estimate of the $LQ_{FROM}$ fields in the Neighbor Status Table and the Route Table. A transmitter's Rx Period is used to compute its flush timer value, the period over which a subsequent signaling packet must be received or the neighbor is deleted. Initially, the transmitter's Rx Period is set to the globally understood (system parameter) average signaling packet generation rate. Subsequent calculations apply a weighted average to the existing rate estimate and current measurement (step 328).

In step 308, the LQ Filter Value is incremented by a predetermined value. Following step 308, in step 318, it is determined whether any signaling packets have been missed since receipt of the last signaling packet from the transmitter. The number of missed packets is determined by comparing the transmitter sequence number (i.e., the sequence number of the presently processed signaling packet) to the last received sequence number from the transmitter's Neighbor Status Table entry ($LQ_{FROM}$ information). If such sequence numbers are consecutive, then no packets have been missed. Otherwise, the gap between the sequence numbers specifies the number of missed packets.

For each missed packet determined in step 318, subsequent steps 320, 322, and 324 are repeated once. In particular, in step 322, the LQ Filter Value for the transmitter is decremented by the predetermined value (as discussed previously, a 75% link performance expectation would use increment/decrement values of ⅓). In step 324, it is determined whether the LQ Filter Value is equal to the INIT value. If the LQ Filter Value equals the INIT value (which is a value indicative of the minimum acceptable link quality between nodes), then the loop is exited and step 328 is next performed. Alternatively, if repetition of the loop consisting of steps 320, 322, and 324 a number of times corresponding to the number of missed packets does not result in the LQ Filter Value decreasing to the INIT value, then the loop is exited after step 320, as shown.

Once the loop consisting of steps 320, 322, and 324 is exited (either by the LQ Filter Value being equal to the INIT value or by the loop repeating once for each missed packet without the LQ Filter Value being decremented to the INIT value), then the link quality monitoring portion of the process is completed and the LQ Filter Value is stored in the transmitter's Neighbor Status Table entry.

In step 328, the Rx Period is computed based on the time interval since receipt of the previous signaling packet from the transmitter and the total number of packets that the transmitter has sourced since the last received packet (i.e. the number of missed packets plus one). For example, if x seconds have lapsed between the present signaling packet receipt and the previous signaling packet receipt, and no packets were missed, then the current receive period sample is set to x seconds. Alternatively, if x seconds have lapsed between the present signaling packet receipt and the previous signaling packet receipt, and 1 packet was missed, then the current receive period sample is set to x/2 seconds. Rx Period is computed by multiplying the current Rx Period value by a weighting factor, adding the current receive period sample, and dividing by the weighting factor plus one. The selection of a weighting factor is system specific, and will depend on messaging rates and desired responsiveness to dynamics.

Steps 330 through 340 support the NIT cleanup process by which it is determined whether nodes have disappeared and thus should be removed from the receiver's NIT and associated tables. This process is based on maintaining a "flush timer." The flush timer defines the period within which a subsequent signaling packet reception is expected to occur for the transmitter of the packet being processed. If a reception does not occur within this time, the transmitter will be removed from the node's database. To this end, each node's NIT entry contains a deletion time stamp 74 (FIG. 4) which is simply the current time plus the flush timer value. The NIT's node entries are periodically checked to detect deletion timers that have been exceeded by the current system time.

Note that this same link quality monitoring methodology is used to maintain the Route Table. In this case, an RUR's source address and sequence number are used in the same fashion as the transmitter address and sequence number. The flush timer associated with an RUR reception is added to the current time and stored as the deletion time stamp for any entries that are affected by the received RUR. In addition, the RUR based flush timer is only computed for non-duplicate RUR receptions (unique source address and sequence number).

In step 33.0, the Flush Timer is reset to zero and a Temp LQ value is set to the LQ value determined in step 310 or 324. In step 332, it is determined whether the Temp LQ Filter value is greater than the INIT value, thereby indicating that the link quality is acceptable. If the Temp LQ value is greater than the INIT value, then the Flush Timer is incremented by the value Rx Period computed in step 336 and the Temp LQ value is decremented by the algorithm's predetermined value in step 334, following which step 332 is again performed. Thus, the Temp LQ value is forced down as the Flush Timer is incremented, until the Temp LQ value is less than or equal to the INIT value, following which step 338 is performed. In this way, the Flush Timer associated with a high quality linked transmitter is increased more than a Flush Timer associated with a lower quality linked transmitter.

In step 338, it is determined whether the Flush Timer value is greater than a predetermined MAX value. If the Flush Timer value is not greater than the MAX value, then the process subsequently terminates at step 342. Alternatively, if the Flush Timer value is greater than the MAX value, then the Flush Timer value is set to the MAX value, following which the process terminates in step 342, as shown. With this arrangement, a transmitter will not be kept in the receiver's NIT for any longer than the interval corresponding to the MAX Flush Timer value.

It will be appreciated by those of ordinary skill in the art that the described link quality monitoring algorithm is one of various possible implementations. In some embodiments, link quality may be estimated as a function of signal strength, correlation quality and other specifications from the radio's signal processing function. Radios that support more advanced mechanisms for assessing RF channel quality will enhance the responsiveness of this protocol's link quality related functionality.

Category Green Node Processing

Received Signaling Packet Processing

The first thing a green node does after the database update processing has completed (common processing for all nodes) is to perform the following state variable processing. First, the green node verifies that it still has at least one black neighbor. If not, the green node resets its state specific variables, starts the selection timer, and transitions to white. Otherwise, the green node verifies the following two variables: (1) If the CTP address has been reset, the green node searches its Neighbor Status Table for the black neighbor with the highest primary gateway degree value (field 99 of the Neighbor Status Table). This neighbor address is written into the green node's CTP field; (2) In addition, as the Neighbor Status Table is searched, each entry's sequence number counter is cleared (i.e., CONNECTION is performed using the CTP; if the CTP changes the CONNECTION process must be restarted).

A green node maintains the address of its category black neighbor advertising the maximum black degree, and the black degree being advertised. If the address has been reset as a result of the database update process, the green node searches its Neighbor Status Table for the black neighbor with the highest black degree. These values are written into the associated state variables. A green node resets its CONNECTION oriented data if its black degree has exceeded the maximum allowable number of black neighbors or a maximum black degree advertised by its black neighbors is greater than or equal to the maximum allowable number of black neighbors. Both of these checks prevent black node saturation, and prevents the green node from becoming category black due to the CONNECTION process.

A green node becomes category black by receiving a Next Hop Information Record with the next hop address field set to its address and the backbone control field (N/C Specifier) set to "turn black request", and passing the following validation logic. First, if the transmitter is black, this is a CONNECTION acknowledgement (i.e., the green node asked the transmitter to turn black, which it did). The green node resets its CONNECTION oriented database—connection candidate address and black degree, standby timer and standby address, and sequence number counter—and transitions to the black state. Otherwise, if the transmitter is green, this is a CONNECTION request, in which case the green node verifies that: (a) It has acceptable link quality with the requesting node; and (b) Its standby address field is unset (i.e., it has not recently initiated or overheard an EXPANSION or CONNECTION transaction). If these checks are passed, then the green node immediately generates a signaling packet containing, at a minimum, a Transmitter Status Record with the color field set to black, and a Next Hop Information Record with the address, LQ, and backbone control fields set to the requesting node's address, current link quality, and "turn black request" respectively. This signaling packet acts as the acknowledgement to the CONNECTION request. The green node then resets its CONNECTION database and transitions to black.

The green node performs further checks to determine if a local event has occurred that dictates resetting the green node's CONNECTION data. The following conditions will result in a reset of the sequence number counter, a reset of the "turn black" flag, a reset of the CONNECTION candidate address and black degree variables, the standby address being set to the green node's address, and the standby timer being started: (1) A new black neighbor has been detected; or (2) A Next Hop Information Record has been received with the backbone control field set to "turn black request." Note that a green node also maintains a counter for each node (the Neighbor Status Table's general purpose timer/counter) that is incremented each time a CONNECTION or EXPANSION process is initiated (the transmitter's Neighbor Status Table entry's counter) with the address. After a specified threshold value, overheard requests from the transmitter will be ignored (i.e., they will not cause a reset of the node's timer and flags).

Green nodes are continuously monitoring received Transmitter Status Records, Next Hop Information Records, and Route Update Records to detect disconnected backbone segments and ongoing CONNECTION transactions. Completion of the SELECTION and EXPANSION processes of FIGS. 7 and 8, respectively, results in a network having at most two category green nodes connected between category black nodes and thus, a network which may not be fully connected. In order to provide full connectivity between category black nodes in the network (i.e., to eliminate disconnected backbone segments), a CONNECTION process is performed by which a category green node (and also a neighboring category green node, in the case of two category green nodes connected between disconnected backbone segments) becomes category black.

The premise behind the CONNECTION process is that a category green node should hear every signaling packet it receives from a directly connected category green neighbor or category black neighbor twice, once directly from the neighbor and again in an RUR from its CTP through the fully connected network. It can be inferred that a disjoint backbone condition exists if a category green node receives a neighbor's signalling packet transmissions, but does not receives RURs for the neighbor from its CTP.

For purposes of the CONNECTION process, each node contains a sequence number counter 98 (FIG. 4A) in which it maintains a count of whether a TSR from the listed neighbor has been received. If a second signaling packet containing an RUR from the same source is received, then the signalling packet was heard directly and via retransmission through a fully connected network, as would occur in the case of signalling packets received by any of the category green nodes in the fully connected network of FIG. 1. Alternatively, if signaling packet retransmission is not detected, then it is determined that the category green node is part of a gap between backbone portions and the category green node is eligible to become category black during the CONNECTION process, as would occur in the case of signalling packets received by the category green node 380 in FIG. 10A.

A green node will not perform CONNECTION processing if any of the following conditions exist: (1) The green node is not backbone capable; (2) The green node has a black neighbor with a black degree greater than or equal to the maximum allowable number of black neighbors; (3) The green node's "turn black" flag is set; (4). The green node's standby address is set; or (5) The green node has a black degree greater than or equal to the maximum allowable number of black neighbors. Furthermore, a green node will not perform CONNECTION processing for specific neighbors if any of the following conditions exist (1) The neighbor is not backbone capable; or (2) The neighbor has a black degree that is greater than or equal to the maximum allowable number of black neighbors, or has a neighbor whose black degree is greater than or equal to the maximum allowable number of black neighbors; (3) The neighbor's advertised CTP is contained in the green node's NIT, since the receiver is already connected to the advertised CTP; or (4) The neighbor is the green node's CTP, since the receiver is already connected to its own CTP.

Figure 10:
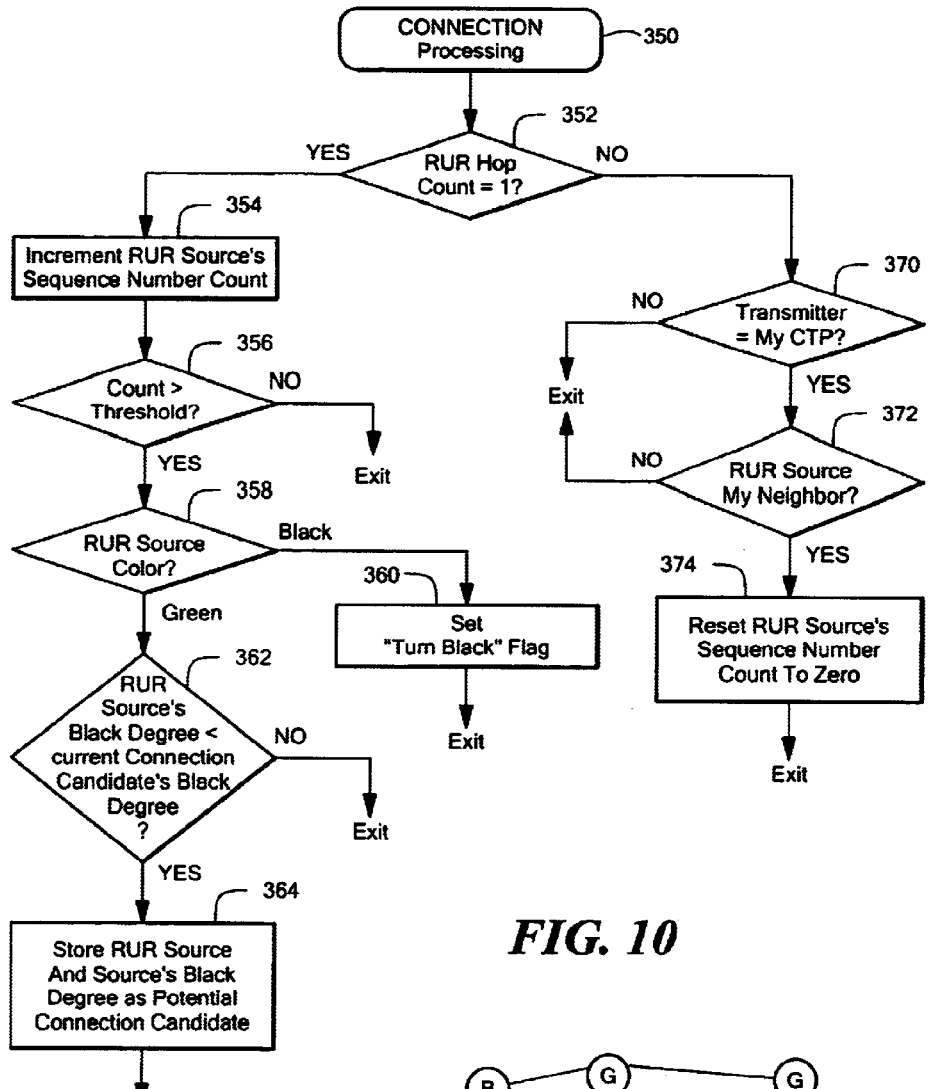
FIG. 10 is a flow diagram illustrating a backbone CONNECTION process performed by category green nodes according to the invention.
Figure 10A:
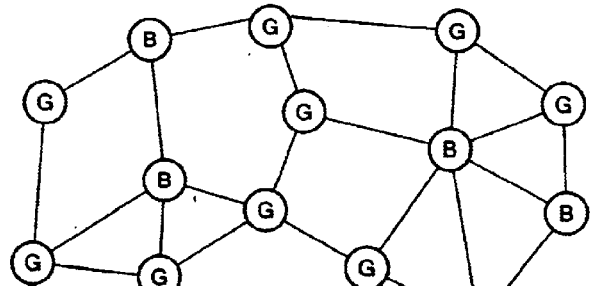
FIG. 10A is a diagram of a wireless network which is not fully connected.

If none of these conditions exists for the green node or are associated with the received RUR, the CONNECTION processing illustrated by FIG. 10 is performed. The process commences in step 350 following which it is determined in step 352 if the received Route Update Record (RUR) from a non-white node has a hop count of one, meaning that the transmitter is a neighbor. In this case, the RUR source's connection sequence number counter 98 (FIG. 4A) is incremented in step 354 in its Neighbor Status Table entry (for a hop count=1, the transmitter of the signaling packet is the source of the RUR). If the counter exceeds a predetermined detection threshold in step 356, the node will, depending on the RUR source color as determined in step 358, either:

(a) for a green neighbor, if the RUR source's black degree is less than the current CONNECTION candidate's black degree as determined in step 362, the node stores the neighbor's address and advertised black degree as the current B-G-G-B CONNECTION 20 candidate in step 364; or (b) if the neighbor is black and not the green node's CTP (B-G-B CONNECTION), the green node will set its "turn black" flag in step 360. The green node will then reset all sequence number counters to zero.

If the hop count of the received RUR is not equal to one, then it is determined in step 370 whether the transmitter is the node's CTP. If the RUR transmitter is the green node's CTP, then it is determined in step 372 whether the RUR source is a neighbor of the green node. If the RUR source is a neighbor of the green node, then the RUR source's sequence number counter is set to zero in step 374, as shown, since this indicates that the backbone is fully connected.

Signaling Packet Generation Processing

A green node checks its CONNECTION variables before generating a signaling packet. The following processing is performed based on the setting of the variables. First, a Transmitter Status Record is generated. If the "turn black" flag is set, the Transmitter Status Record's color field is set to black, the CONNECTION oriented database is reset, the standby timer is disabled, and the standby address is reset. Otherwise, the Transmitter Status Record is generated and queued using the green node's current state information.

Next Hop Information Record generation proceeds as follows. If the "turn black" flag is not set, the CONNECTION candidate address field is checked. If set, the green node will set the Next Hop Information Record fields—next hop address, LQ, and backbone control—to the CONNECTION candidate address, associated LQ, and "turn black" respectively. Additionally, the standby timer will be started and the candidate's counter field will be incremented. Otherwise, the green node will set the Next Hop Information Record fields—next hop address, LQ, and backbone control—to one of its gateway addresses, the gateway's LQ value, and either "CTP advertisement" (if the gateway address is equal to its CTP address) or "gateway advertisement". This information supports the MAINTENANCE process, as will be described Standby Timer Expiration Processing The standby timer and associated standby address are used to allow a pending request, such as a CONNECTION request, time to complete before a green node initiates another backbone related process. The standby address and standby timer are used to give the next hop address time to process, and respond to, the request before the green node tries something else. If the standby timer expires, it means that the request failed and the green node is free to try something else. Upon standby timer expiration, the green node resets the standby address.

Category Black Node Processing

Received Signaling Packet Processing

Black nodes are a part of the network backbone, and as such support end-to-end packet transfer for their neighbors. In particular, black nodes perform three basic processes—protocol support record forwarding, MAINTENANCE, and link quality feedback.

A black node will not remain black unless it receives a Next Hop Information Record from one of its black neighbors with its address in the next hop address field (N/C ID) and the Backbone Control field (N/C Specifier) set to "gateway advertisement" at a predetermined minimum rate. A black node accepts these records from green nodes if it has a black degree of zero (no black neighbors). This is referred to as the MAINTENANCE process. Black nodes maintain a gateway timer that is initialized, and reset, to the maximum signaling packet generation interval. A black node initializes the timer when it enters the black state. A received Next Hop Information Record, therefore, is checked for a next hop address equal to the receiving black node's address and a Backbone Control field equal to "gateway advertisement" or "CTP advertisement. " If this occurs, the black node's gateway timer is reset. In this sense, the gateway timer represents a period of time over which a black node expects to hear at least one of its neighbors advertise its address as a worthwhile gateway.

Figure 11:
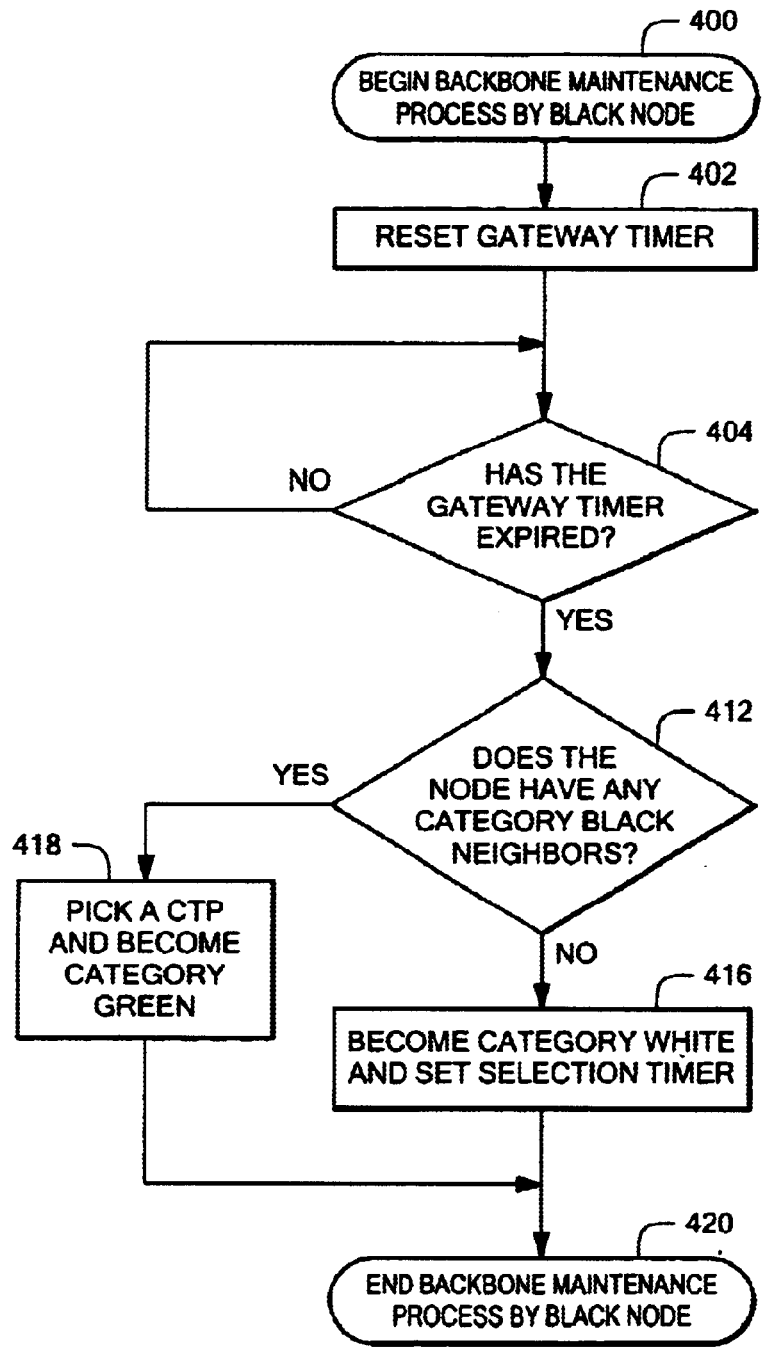
FIG. 11 is a flow diagram illustrating a backbone MAINTENANCE process according to the invention.

With specific reference to FIG. 11, the backbone MAINTENANCE process is illustrated. Since backbone nodes reserve some of their bandwidth for backbone functionality of forwarding signaling packets and data packets, the process of eliminating unnecessary category black nodes advantageously optimises bandwidth usage.

The MAINTENANCE process commences at step 400 with receipt of a Next Hop Information Record identifying the category black node as valuable. More particularly, if the black node has a non-zero black degree, then such a Next Hop Information Record must be provided by a category black neighbor with the backbone control field specifying a "gateway advertisement." Alternatively, if the black node has no category black neighbors, then such a Next Hop Information Record is provided by a category green neighbor with the backbone control field specifying a "CTP advertisement." Upon hearing its "name called" in this manner, the category black node resets a gateway timer in step 402. The gateway timer is maintained by all category black nodes and is set to expire at a predetermined duration after the node becomes category black. Step 404 is repeated until the gateway timer expires. Once the gateway timer expires, the receiver is considered non-valuable and becomes either category white or category green.

In order to determine whether the non-valuable category black node will become category white or category green, it is determined in step 412 whether or not the node has any category black neighbors. If the node does not have any category black neighbors, then, in step 416, the node becomes category white and sets its selection timer, following which the process is terminated in step 420. Note that in this case, it is the category black node's category green neighbors that are responsible for setting the turn black request flag. Alternatively, if the category black node has at least one category black neighbor, then the category black node selects a CTP and becomes category green in step 418, following which the process is terminated in step 420.

Received protocol support records are forwarded by a black node within the following guidelines: (1) the record is a non-duplicate; (2) the record's age field has not reached zero (expired record); and (3) the black node is operating within the acceptable bandwidth utilization limits (system specific) for signaling packet transmissions. Duplicate and expired records are discarded. Protocol support records are queued using the following guidelines: (1) Route Query and Response Records are queued first (highest priority); (2) Multicast Join and Leave Records are queued next; (3) RURs are queued according to hop count (lowest hop count is queued first); (4) Next Hop Information Records are queued after RURs with a hop count less than 3, and before RURs with a hop count greater than 3. In addition, NHRs containing a backbone control field set to "gateway advertisement" are queued before all RURs; and (5) Address Resolution records are queued last.

Queuing records in this fashion automatically allows lowest priority records to "fall off" the end of the Record Queue when an overflow condition is experienced. The exception to this rule is that RURs with a hop count less than 3 cannot be deleted. If this condition occurs, the black node must transition to green (if it has at least one black neighbor) or white (if it has no black neighbors). This queuing strategy also deals with the condition where a black node's received record rate exceeds its allowable bandwidth utilization level. This condition results in the Record Queue filling up until it begins to overflow, which is dealt with by the previously discussed logic.

Black nodes support link quality feedback by generating Next Hop Information records when the following conditions occur: (1) A Transmitter Status Record is received from a white neighbor; (2) A Next Hop Information Record is received from a green neighbor specifying the black node as the next hop address and an associated backbone control field of either "gateway advertisement" or "CTP advertisement"; (3) A Next Hop Information Record is received from a black neighbor specifying the black node as the next hop address. The Next Hop Information Record's LQ field is set to the next hop address NIT entry's $LQ_{FROM}$ filter value.

Signaling Packet Generation Processing

As discussed previously, a black node generates signaling packets for two reasons. First, a black node uses the color independent signaling packet generation process described above. Second, black nodes generate signaling packets for the purpose of forwarding protocol support records. The basic philosophy is that black nodes generate signaling packets at a rate that matches the Record Queue input rate (i.e., they attempt to maintain an empty queue). This philosophy stays in effect until the black node's signaling packet generation rate reaches the maximum allowable rate. Typically, system policy decides how much bandwidth will be allowed for protocol signaling.

Since signaling packet size varies from system to system, this invention does not address specific packet sizes. It is assumed that the signaling packet generation process knows the maximum allowable packet size (sometimes referred to as the Maximum Transmission Unit, or MTU), and will concatenate queued records until the MTU is reached. As a part of this process, records that are "age limited" are updated to reflect the amount of time it has been held by the black node. Basically, the record's age is decremented by the amount of time that has elapsed since it was received. If this results in a negative value, the age field is set to zero, which causes it to be discarded by any black node that receives it. Note that RURs cannot be discarded until their hop count exceeds 3.

Gateway Timer Expiration

Gateway timer expiration implies that the black node is no longer needed as a backbone member, as discussed above in connection with the MAINTENANCE process. Upon timer expiration, a black node flushes its Record Queue 60 and transitions to either green (if it has at least one black neighbor) or white (if it has zero black neighbors). In addition, the node immediately generates a signaling packet to notify its neighbors of its color change.

Multicast Routing

Figure 12:
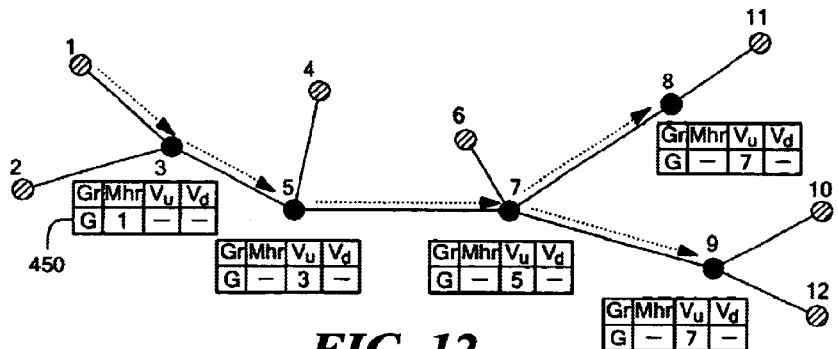
FIGS. 12–12E are diagrams of a wireless network over which multicast transmissions are implemented.
Figure 12A:
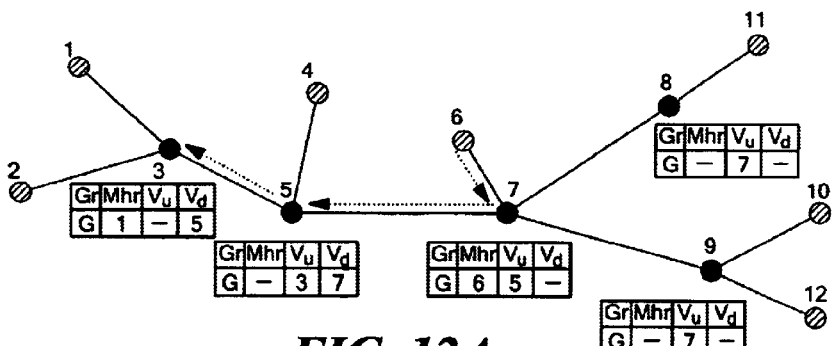
Figure 12B:
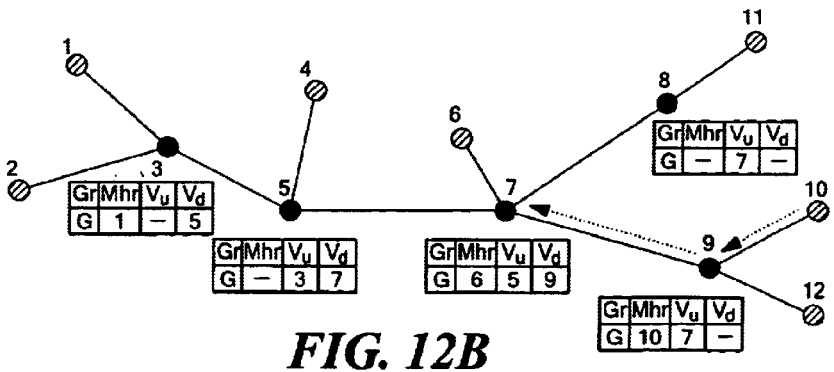
Figure 12C:
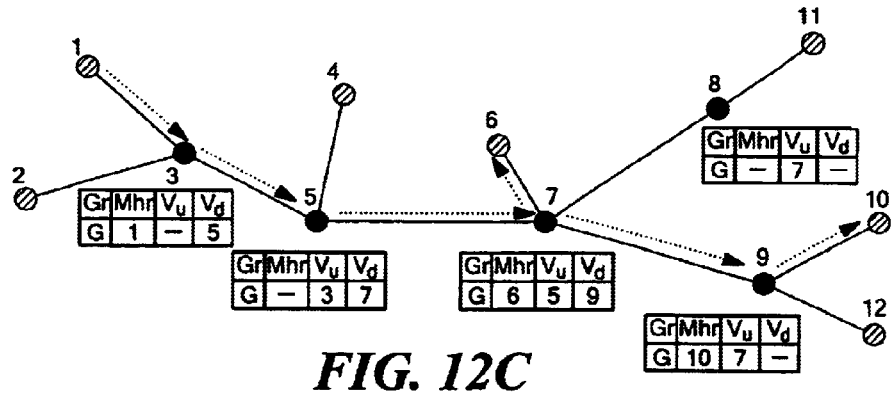
Figure 12D:
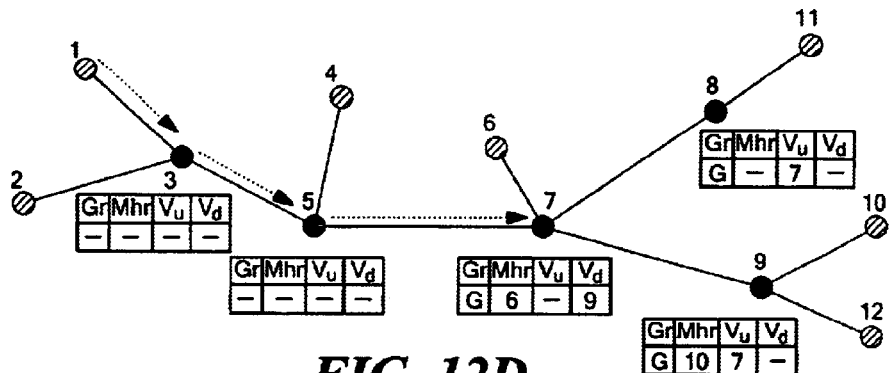
Figure 12E:
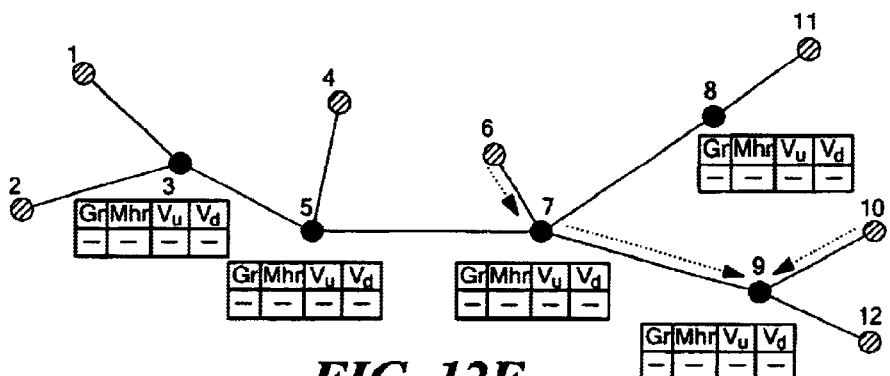

Referring to FIGS. 12–12E, multicast routing over a network established and maintained according to the above-described protocol is illustrated. Multicast routing refers to a transmission from one source node, or transmitter to multiple receivers. The packet is copied by nodes in the network and forwarded to the multiple receivers. In order to support multicast transmissions efficiently, multicast groups are established and maintained. To this end, each of the category black nodes maintains a multicast routing table (MRT) 450 (labelled 61 in FIG. 3) consisting of four fields: a group address (Gr), a list of local group members (Mbr), each of which is a direct (or one-hop) neighbor of the category black node and has joined the group Or, the closest upstream category black node (Vu), and a list of downstream category black nodes (Vd). When Vu is present, it indicates that the root of the tree comprising backbone node group members exists towards Vu. When the list Vd is not empty, it indicates that the tree further extends "down."

When a node wishes to join a multicast group, it generates a multicast join message (MJM) containing the group address (Gr), and a connection test point (CTP). The term "upstream" refers to the direction toward the root of the group (the originator of the first MJM for this group), and "downstream" refers to the direction of forwarding the to first received MJM of the group.

When a category black node receives an MJM for which it is designated as the CTP, the category black node updates its MRT. The category black node also decides whether or not to forward the MJM depending on the status of its MRT, as specified in Table I:

TABLE I

| STATUS | ACTIONS |
| --- | --- |
| Neither Vu nor Vd designated | If it is the first MJM for the specified multicast group, create a new entry in the MRT and forward it over the backbone. Otherwise, meaning that there is an entry already created for the specified group, simply update the corresponding Mbr, but do not forward |
| Only Vd designated | Do not forward MJM because the tree has been set up, and it is the root of the tree. Simply update the corresponding Mbr |
| Only Vu designated | If the corresponding Mbr is empty, update it and forward it to only Vu since it is the leaf of the tree (no downstream known). |
| Both Vu and Vd designated | The multicast tree for this group has been already established. Do not forward MJM and simply update MBr. |

Any category black node $b_2$ receiving a forwarded MJM from a category black neighbor $b_1$ updates its MRT and further forwards the MJM according to the status of its MRT, as specified in Table II:

TABLE II

| STATUS | ACTION |
| --- | --- |
| Neither Vu nor Vd designated | If it is the first MJM for the specified group Gr, first create a new MRT entry for this group. Then, set Vu to $b_1$ and continue to forward MJM over the backbone. Otherwise, meaning that this black node is the root of the tree, set Vd to $b_1$ and do not forward MJM. In this case, this black node must have non-empty Mbr for this group. |
| Only Vu designated | If it is the first MJM for the specified group Gr, first create a new MRT entry for this group. Then, set Vd to $b_1$ and forward MJM. Otherwise, set Vd to $b_1$ but do not forward MJM. |
| Only Vd designated | If $b_1$ is not in the list Vd, add $b_1$ to the Vd list. Do not forward this MJM since it is the root of the tree. |
| Both Vu and Vd designated | Add $b_1$ to the Vd list if not in the list. Do not forward MJM. |

When a node changes its CTP, it generates a new MJM designating the new CTP. The old CTP will remove this neighbor from its MRT when the node is deleted from its NIT.

When a node leaves a group, it generates a multicast leave message (MLM) and transmits the MLM to its CTP by which it joined the group. Upon receiving the MLM, the CTP deletes the leaving node from its MRT. If the leaving node is the last local member for this group, then the CTP determines if it is at the end of the tree. If the Vd list is empty, it is at the bottom of the tree and therefore prunes itself from the tree by forwarding the leave message to the corresponding Vu. When a forwarded MLM is received and its transmitter is in the Vd list, then it deletes this node from Vd. If Vd becomes empty as a result of this, then it further forwards it to its corresponding Vu. If no Vu exists, then it has reached the root of the tree. The root node simply deletes the transmitter of this MLM from its own Vd list.

With the information of local membership (Mbr), upstream gateway Vu, and downstream gateway(s) (Vd list) maintained in the MRT, multicast routing is achieved simply by forwarding multicast packets to appropriate gateways. Implementation of the above-described multicast routing scheme is illustrated with reference to FIGS. 12–12E which show, for each node, the MRT 450 maintained by the node.

FIG. 12 shows the first step in creating a multicast group Gr; namely, a node 1 sends an MJM to its CTP, node 3. This MJM is forwarded by node 3 to all other backbone nodes, 5, 7, 8, and 9, as shown since neither a Vd nor a Vu is designated for node 3. Upon receipt of the MJM, node 3 sets its local member to node 1. The category black nodes 5, 7, 8, and 9 configure their Vu according to the forwarded MJM. In particular, node 5 designates node 3 as its Vu, node 7 designates node 5 as its Vu, node 8 designates node 7 as its Vu, and node 9 designates node 7 as its Vu.

FIG. 12A shows node 6 joining the multicast group G via its CTP node 7. Since node 7 already has a Vu designated, node 7 updates its Mbr and forwards the MJM to node 5, according to Table I. Node 5, upon receiving the forwarded MJM and having only its Vu configured, designates its Vd as node 7 and forwards the MJM to its Vu, node 3, according to Table II. Node 3, upon receiving the forwarded MJM, having neither its Vu nor its Vd configured, and having one local member designated, designates its Vd as node 5 and does not forward the MJM further, according to Table II.

FIG. 12B illustrates node 10 joining the multicast group G via its CTP node 9. Upon receipt of the MJM, CTP node 9 which has only its Vu set, updates its Mbr and forwards the MJM to its Vu node 7. Node 7, upon receiving the forwarded MJM and having only its Vu configured, designates node 9 as its Vd and does not forward the MJM since it has a local member, node 6, in its MRT, according to Table II.

FIG. 12C illustrates routing of a data packet from source node 1 to the members of the multicast group G. Each intermediate node in the tree receiving the multicast packet from one direction forwards it to the other direction. If there are multiple nodes designated as Vd and multicast packets arrive via one of them, they are forwarded to both the Vu node and all other Vd nodes. Nodes that have only one of a Vu node and a Vd node configured (at the edge of a tree) do not forward multicast data packets.

FIG. 12D illustrates a node, node 1 leaving the multicast group. This is achieved by node 1 sending an MLM to its CTP node 3. Since node 1 is the last local member and node 3 knows it is at the edge of the tree, since it only has one gateway (Vd) configured, node 3 no longer needs to be part of the tree. Hence, it forwards the leave message to Vd node 5 and deletes node 5 from its MRT. Similarly, node 5 removes itself from the multicast tree by forwarding the received MLM to node 7 and deleting node 7 from its MRT. Node 7 unassigns node 5 as its Vu, but does not forward this MLM further since it has a local member. After this step, the multicast tree consists of nodes 7 and 9 only.

FIG. 12E shows nodes 6 and 10 leaving the multicast group. This causes the MRTs for nodes 7 and 9 to empty and the MRT for node 8 becomes empty at a predetermined time after node 8 has not been part of the tree.

As is apparent from the above description and example of multicast routing over a network according to the protocol of the invention, the resulting network facilitates dynamic multicast routing in an efficient manner. This is because (i) the backbone, which is capable of reaching all nodes as established and maintained according to the above-described protocol, is minimized; and (ii) the multicast tree which is set up on top of the backbone further limits the forwarding of packets to only those nodes who are part of the multicast tree. Multicast trees comprising subsets of the backbone nodes, are dynamically established and maintained based on the status of a Multicast Routing Table maintained by each backbone node and in response to Multicast Join and Leave Records.

Figure 13:
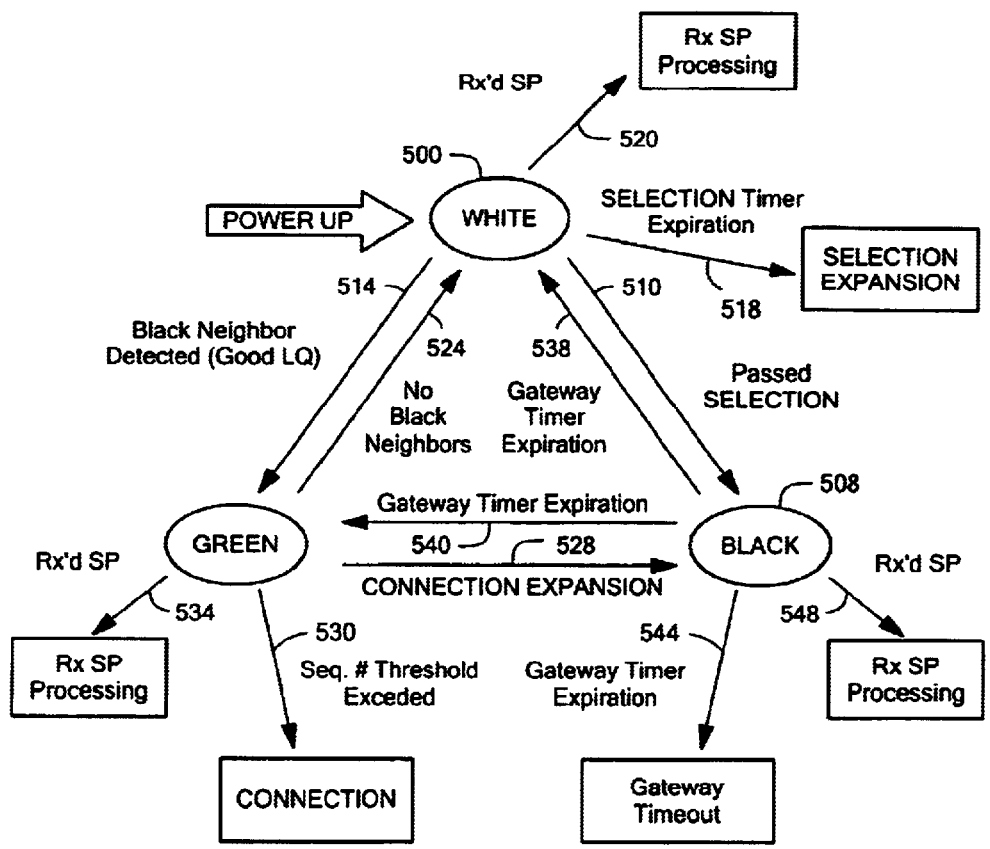
FIG. 13 is a state diagram illustrating backbone and non-backbone node states.

Referring to FIG. 13, a simplified state diagram illustrates conditions resulting in transitions between the category white state 500, the category green state 504 and the category black state 508. At power up, every node is initially designated category white 500. A category white node may immediately transition to the black state if its backbone capable specifier has been configured to "black lock". This allows specific nodes to be forced to the black state because of a priori knowledge about their location or physical characteristics. A category white node may become category black during the above-described SELECTION process as labeled 510. Further, detection of a category black neighbor with which a category white node has good two-way link quality causes the category white node to transition to category green as labeled 514.

As labeled 518, when the selection timer expires, the category white node performs the SELECTION or EXPANSION process. Further, processing of received signaling packets is performed in response to receipt of a signaling packet, as labeled 520. As a result of received signal packet processing, a white node may transition to the green state if it verifies the existence of acceptable 2 way link quality with a black neighbor.

A category green node transitions to category white if no category black neighbors with good two-way link quality are detected, as labeled 524. This condition can occur, for example, if a black neighbor moves away from the green node. A category green node may transition to category black as part of the EXPANSION or CONNECTION processes described above and as labeled 528. The CONNECTION process is performed by category green nodes when the sequence number count threshold is exceeded and results in B-G-B CONNECTION (labeled 530), or received packet processing detects a CONNECTION request as a part of B-G-G-B CONNECTION, labeled 534.

Finally, a category black node may transition to category white when its gateway timer expires with no category black neighbors with acceptable two-way link quality detected, as labeled 538. Whereas, if the gateway timer expires with category black neighbors having acceptable two-way link quality detected, then the category black node transitions to category green as labeled 540. State transitions of the category black node are initiated by the gateway timer expiring, as labeled 544. Signaling packets are processed by category black nodes upon receipt, as labeled 548.

In view of the above description of the protocol of the present invention, it will now be apparent that nodes are constantly evaluating their gateways based on link quality and forwarding degree (i.e., how many nodes they are the primary gateway for). If a link degrades with an existing gateway or a gateway with higher forwarding degree is detected for the same destination, the node will automatically change its gateway designation for the specified destination. In the case of link degradation, the node will eventually purge the gateway completely upon expiration of the deletion time stamp (i.e., it no longer considers the category black node a good neighbor and purges all routes associated with it).

Having described the preferred embodiments of the invention, it will now become apparent to one of ordinary skill in the art that other embodiments incorporating their concepts may be used. It will be appreciated by those of ordinary skill in the art that various modifications to the above-described implementation are possible without departing from the spirit of the invention. It is felt therefore that these embodiments should not be limited to disclosed embodiments but rather should be limited only by the spirit and scope of the appended claims. All publications and references cited herein are expressly incorporated herein by reference in their entirety.

What is claimed is:

1. A method for establishing a network from a plurality of nodes, said network comprising a first subset of said plurality of nodes designated as backbone nodes and a second subset of said plurality of nodes designated as non-backbone nodes, said method comprising the steps of:

periodically transmitting a signaling packet by each of said plurality of nodes, wherein each of said plurality of nodes transmitting said signaling packet is a transmitter and each of said signaling packets contains at least one protocol support record;

selecting as backbone nodes a subset of said plurality of nodes in response to said at least one protocol support record; and forwarding said at least one protocol support record to neighboring nodes only by said backbone nodes.

2. The method of claim 1 wherein each of said plurality of nodes transmits signaling packets containing at least one protocol support record indicating transmitter status at a random rate between a maximum rate and a minimum rate, wherein said maximum rate and said minimum rate are a function of an expected mobility of said plurality of nodes.

3. The method of claim 2 wherein each of said plurality of backbone nodes transmits additional signaling packets at a second rate determined by either (a) the number of protocol support records contained in a record queue if the available bandwidth of the transmitter dedicated to signaling packet processing has not been exceeded or (b) a predetermined maximum rate if said available bandwidth has been exceeded.

4. The method of claim 3 wherein said predetermined maximum rate is a predetermined percentage of a total system bandwidth allocated for signaling packet processing.

5. The method of claim 1 wherein each protocol support record supports a predetermined function related to establishing or maintaining said network and wherein protocol support records are forwarded by said backbone nodes according to a predetermined priority assigned to said protocol support records.

6. The method of claim 1 wherein said backbone selecting step comprises the step of selecting as a backbone node each of said plurality of nodes which has more non-backbone neighboring nodes than any of its neighboring nodes.

7. The method of claim 1 further comprising the step of connecting said backbone nodes together in response to receipt by a non-backbone node of a protocol support record containing the address of the non-backbone node and a request that the non-backbone node become a backbone node.

8. The method of claim 1 further comprising the step of maintaining said network by each backbone node monitoring receipt of protocol support records identifying the backbone node as a valuable backbone member.

9. The method of claim 8 wherein each of said backbone nodes remains a backbone node as long as it is identified as a valuable backbone member at a predetermined minimum rate.

10. A method for establishing a network from a plurality of nodes, said network comprising a first subset of said plurality of nodes designated as backbone nodes and a second subset of said plurality of nodes designated as non-backbone nodes, said method comprising the steps of:

periodically transmitting a signaling packet by each of said plurality of nodes to neighboring nodes, wherein each of said plurality of nodes transmitting said signaling packet is a transmitter and each of said signaling packets contains at least one protocol support record indicating status information about the transmitter; and prior to one of said plurality of nodes transitioning to a backbone node in response to receipt of said at least one protocol support record, evaluating the quality of a link between said node and at least one neighboring node in order to verify that said link quality meets a predetermined minimum requirement.

11. The method of claim 10 wherein said link quality evaluating step comprises the step of determining whether or not signaling packets are received from said at least one neighboring node at rate greater than a predetermined minimum rate.

12. The method of claim 10 further comprising the step of maintaining a table at each of said plurality of nodes in response to receipt of said signaling packets from other nodes, wherein said table contains an indicator of link quality from said other nodes to said node at which said table is maintained.

13. The method of claim 12 further comprising the step of maintaining, at each of said plurality of nodes, at least one statistic based on data contained in said table, wherein said link quality evaluating step is performed prior to said other nodes being included in said statistic.

14. The method of claim 12 wherein said table is a Neighbor Status Table and each of said other nodes is a neighbor of said node at which said table is maintained.

15. The method of claim 14 wherein said Neighbor Status Table further contains an indicator of link quality from said node at which said table is maintained to said other nodes.

16. The method of claim 12 wherein said table is a Route Table and none of said other nodes is a neighbor of said node at which said table is maintained.

17. The method of claim 10 further comprising the step of designating a subset of said plurality of backbone nodes as a multicast tree, wherein said plurality of backbone nodes comprising said multicast tree forward packets to members of a multicast group.

18. The method of claim 17 wherein each of said plurality of backbone nodes comprising said multicast tree maintains a Multicast Routing Table based on received protocol support records comprising Multicast Join and Leave Records.

19. The method of claim 18 wherein each of said plurality of backbone nodes comprising said multicast tree forwards multicast packets to members of said multicast group based on entries in said Multicast Routing Table.

* * * * *

UNITED STATES PATENT AND TRADEMARK OFFICE
CERTIFICATE OF CORRECTION

PATENT NO. : 6,791,949 B1
DATED : September 14, 2004
INVENTOR(S) : Bong K. Ryu et al.

It is certified that error appears in the above-identified patent and that said Letters Patent is hereby corrected as shown below:

Column 5,
Line 49, reads "$NN_{G8}$" and should read -- $N_{G8}$ --.

Column 7,
Line 31, reads "records which" and should read -- records 20 which --.

Column 14,
Line 9, reads "P." and should read -- $\mu$. --.
Line 52, reads "P" and should read -- $\mu$ --.

Column 15,
Line 35, reads "NBS" and should read -- $N_{B8}$ --.

Column 17,
Line 57, reads "Recall-that" and should read -- Recall that --.

Column 20,
Line 37, reads "fiction" and should read -- function --.

Column 21,
Lines 29, 35 and 53, reads "TBSP" and should read -- $T_{BSP}$ --.
Line 43, reads "with" and should read -- when --.

Column 24,
Line 48, reads "embodiment the" and should read -- embodiment, the --.

Column 26,
Line 7, reads "33.0" and should read -- 330 --.

Column 28,
Line 6, reads "receives" and should read -- receive --.
Line 60, reads "CONNECTION 20 candidate" and should read -- CONNECTION candidate --.

Column 31,
Line 59, reads "group or" and should read -- group Gr --.

UNITED STATES PATENT AND TRADEMARK OFFICE
CERTIFICATE OF CORRECTION

PATENT NO. : 6,791,949 B1
DATED : September 14, 2004
INVENTOR(S) : Bong K. Ryu et al.

It is certified that error appears in the above-identified patent and that said Letters Patent is hereby corrected as shown below:

Column 32,
Line 3, reads "the to" and should read -- the --.

Column 36,
Line 26, reads "at rate" and should read -- at a rate --.

Signed and Sealed this

Fifth Day of April, 2005

JON W. DUDAS
*Director of the United States Patent and Trademark Office*